US012550105B2

(12) United States Patent
Ghimire et al.

(10) Patent No.: US 12,550,105 B2
(45) Date of Patent: Feb. 10, 2026

(54) MEASUREMENT AND SIGNALING FOR ENABLING POSITION DETERMINATION IN NETWORKS INCLUDING NON-TERRESTRIAL COMPONENTS

(71) Applicant: Fraunhofer-Gesellschaft zur Förderung der angewandten Forschung e.V., Munich (DE)

(72) Inventors: Birendra Ghimire, Erlangen (DE); Norbert Franke, Erlangen (DE); Alexander Hofmann, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 289 days.

(21) Appl. No.: 18/354,019

(22) Filed: Jul. 18, 2023

(65) Prior Publication Data

US 2023/0358843 A1 Nov. 9, 2023

Related U.S. Application Data

(63) Continuation of application No. PCT/EP2022/050277, filed on Jan. 7, 2022.

(30) Foreign Application Priority Data

Jan. 22, 2021 (EP) ..................................... 21153084

(51) Int. Cl.
H04W 64/00 (2009.01)
(52) U.S. Cl.
CPC .................................. H04W 64/00 (2013.01)
(58) Field of Classification Search
CPC ... H04W 64/00; H04W 48/12; H04W 12/104; G01S 5/0246; G01S 19/38; G01S 19/00
See application file for complete search history.

(56) References Cited

U.S. PATENT DOCUMENTS 11,678,291 B2 * 6/2023 Edge .................... H04W 4/029
455/456.1
12,035,189 B2 * 7/2024 Määttänen ...... H04W 36/00837
(Continued)

FOREIGN PATENT DOCUMENTS

EP 1006678 A1 6/2000

OTHER PUBLICATIONS

3GPP TS 38.305, "NG Radio Access Network Stage 2 functional specification of User Equipment (UE) positioning in NG-RAN", Jul. 2020, Rel. 16, V16.1.0.
3GPP TS 38.455, "NG-RAN; NR Positioning Protocol A (NRPPa)", Jul. 2020, Rel. 16, V16.0.0.
Ericsson, "report of e-mail discussion", R2-1916391, Nov. 18-22, 2019, 3GPP TSG-RAN WG2 Meeting #108 Reno, US.
(Continued)

Primary Examiner — Dhaval V Patel
(74) Attorney, Agent, or Firm — Bridgeway IP Law Group, PLLC; Jihun Kim

(57) ABSTRACT

An apparatus for determining a position of a user device, UE, of a wireless communication network is described. The wireless communication network includes a radio access network, RAN, and a plurality of non-terrestrial network, NTN, components, like an airborne vehicle or a spaceborne vehicle, operating on a bent pipe principle for a transmission between the UE and the RAN. The wherein the apparatus is to receive (1) for bent pipe transmissions between the UE and the RAN via at least two different NTN components respective values indicative of a distance between the UE and the RAN, or (2) one or more Doppler values for each link between the UE and the at least two NTN components. The apparatus is to obtain positions of the at least two NTN components, and determine the position of the UE using the obtained positions of the at least two NTN components and the values or one or more Doppler values.

16 Claims, 17 Drawing Sheets

(56) References Cited

U.S. PATENT DOCUMENTS

2003/0054834 A1    3/2003  Gutowski et al.
2022/0057524 A1*   2/2022  Zhang .................... G01S 19/41
2022/0201676 A1*   6/2022  Kumar ................. H04W 76/27
2022/0264491 A1*   8/2022  Cha ....................... H04L 5/0051

OTHER PUBLICATIONS

3GPP TS 29.571, "Technical Specification Group Core Network and Terminals; 5G System; Common Data Types for Service Based Interfaces; Stage 3", Jun. 2020, Rel. 16, V16.4.0.

3GPP TS 23.316, "Wireless and wireline convergence access support for the 5G System (5GS)", Jul. 2020, Rel. 16, V16.4.0.

3GPP TS 36.305, "Evolved Universal Terrestrial Radio Access Network (E-UTRAN); Stage 2 functional specification of User Equipment (UE) positioning in E-UTRAN", Jul. 2020, Rel. 15, V15.5.0.

3GPP TS 36.305, "Evolved Universal Terrestrial Radio Access Network (E-UTRAN); Stage 2 functional specification of User Equipment (UE) positioning in E-UTRAN", Jul. 2020, Rel. 16, V16.1.0.

3GPP TS 37.355, "LTE Positioning Protocol", Jul. 2020, Rel.16, V16.1.0.

3GPP TS 38.413, "NG-RAN; NG Application Protocol", Jul. 2020, Rel. 16, V16.2.0.

\* cited by examiner

| IE/group name | presence | range | IE type and reference | semantics description |
|---|---|---|---|---|
| TRP ID | M | | 9.2.24 | |
| TRP information type | | 1... <maxno TRPinfo types> | | |
| >CHOICE TRP information item | M | | | |
| >>NR PCI | M | | INTEGER (0 ...1007) | NR physical cell ID |
| >>NG-RAN CGI | M | | 9.2.6 | |
| >>NR ARFCN | M | | INTEGER (0 ...279165) | |
| >>PRS configuration | M | | 9.2.44 | |
| >>SSB information | M | | 9.2.54 | |
| >>SFN initialisation time | M | | 9.2.36 | |
| >>spatial direction information | M | | 9.2.45 | |
| >>geographical coordinates | M | | 9.2.46 | |
| >>NTNgateway | M | | boolean | 1 for NTN gateway, 0 for others |

Fig. 7

RRCSetupComplete message

```
-- ASN1START
-- TAG-RRCSETUPCOMPLETE-START

RRCSetupComplete ::=            SEQUENCE {
    rrc-TransactionIdentifier       RRC-TransactionIdentifier,
    criticalExtensions              CHOICE {
        rrcSetupComplete                RRCSetupComplete-IEs,
        criticalExtensionsFuture        SEQUENCE { }
    }
}
RRCSetupComplete-IEs ::=        SEQUENCE {
    selectedPLMN-Identity           INTEGER (1..maxPLMN),
    registeredAMF                   RegisteredAMF                                           OPTIONAL,
    guami-Type                      ENUMERATED {native, mapped }                            OPTIONAL,
    s-NSSAI-List                    SEQUENCE (SIZE (1..maxNrofS-NSSAI)) OF S-NSSAI          OPTIONAL,
    dedicatedNAS-Message            DedicatedNAS-Message,
    ng-5G-S-TMSI-Value              CHOICE {
        ng-5G-S-TMSI                    NG-5G-S-TMSI,
        ng-5G-S-TMSI-Part2              BIT STRING (SIZE (9) )
    }                                                                                       OPTIONAL,
    lateNonCriticalExtension        OCTET STRING                                            OPTIONAL,
    nonCriticalExtension            RRCSetupComplete-v1610-IEs                              OPTIONAL
}

RRCSetupComplete-v1610-IEs ::=  SEQUENCE {
    iab-NodeIndication-r16          ENUMERATED { true }                                     OPTIONAL,
    idleMeaAvailable-r16            ENUMERATED { true }                                     OPTIONAL,
    ue-MeasurementsAvailable-r16    UE-MeasurementsAvailable-r16                            OPTIONAL,
    mobilityHistoryAvail-r16        ENUMERATED { true }                                     OPTIONAL,
    mobilityState-r16               ENUMERATED { normal, medium, high, spare }              OPTIONAL,
    nonCriticalExtension            SEQUENCE { }                                            OPTIONAL,
}

RegisteredAMF ::=               SEQUENCE {
    plmn-Identity                   PLMN-Identity                                           OPTIONAL,
    amf-Identifier                  AMF-Identifier
}

-- TAG-RRCSETUPCOMPLETE-STOP
-- ASN1STOP
```

Fig. 12

```
-- ASN1START
-- TAG-COMMONLOCATIONINFO-START

CommonLocationInfo-r16 ::= SEQUENCE {
    gnss-TOD-msec-r16        OCTET STRING    OPTIONAL,
    locationTimeStamp-r16    OCTET STRING    OPTIONAL,
    locationCoordinate-r16   OCTET STRING    OPTIONAL,
    locationError-r16        OCTET STRING    OPTIONAL,
    locationSource-r16       OCTET STRING    OPTIONAL,
    verlocityEstimate-r16    OCTET STRING    OPTIONAL
}

-- TAG-COMMONLOCATIONINFO-STOP
-- ASN1STOP
```

Fig. 14

MEASUREMENT AND SIGNALING FOR ENABLING POSITION DETERMINATION IN NETWORKS INCLUDING NON-TERRESTRIAL COMPONENTS

CROSS-REFERENCES TO RELATED APPLICATIONS

This application is a continuation of copending International Application No. PCT/EP2022/050277, filed Jan. 7, 2022, which is incorporated herein by reference in its entirety, and additionally claims priority from European Application No. EP 21 153 084.5, filed Jan. 22, 2021, which is incorporated herein by reference in its entirety.

BACKGROUND OF THE INVENTION

The present invention refers to wireless communication systems or networks, more specifically to wireless communication networks including non-terrestrial network, NTN, components. Embodiments concern the determination of a position of a user device, UE, within such a wireless communication network and transmitting or receiving via the NTN components.

FIG. 1 is a schematic representation of an example of a wireless network 100 including, as is shown in FIG. 1(a), the core network 102 and one or more radio access networks $RAN_1$, $RAN_2$, ... $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure.

FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. The external network may be the Internet, or a private network, such as an Intranet or any other type of campus networks, e.g. a private WiFi or 4G or 5G mobile communication system. Further, some or all of the respective base station $gNB_1$ to $gNB_5$ may be connected, e.g. via the S1 or X2 interface or the Xn interface in NR, with each other via respective backhaul links $116_1$ to $116_5$, which are schematically represented in FIG. 1(b) by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more of a system information block, SIB, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. Note, the sidelink interface may a support 2-stage SCI. This refers to a first control region containing some parts of the SCI, and optionally, a second control region, which contains a second part of control information.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix, CP, length. A frame may also consist of a smaller number of OFDM symbols, e.g. when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE- Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations.

The above described wireless network may also include non-terrestrial network, NTN, components. The wireless communication network including terrestrial components and non-terrestrial components refers to networks or segments of networks using an airborne or spaceborne vehicle for transmission, i.e., a transceiver of the network communicating with the users and the core network is provided in an airborne or spaceborne vehicle. Spaceborne vehicles may include satellites with different altitudes or orbital periods, like a low earth orbit, LEO, a medium earth orbit, MEO, a geosynchronous orbit, GSO, a geostationary orbit, GEO, or a high earth orbit, HEO, whereas airborne vehicles may include unmanned aircraft systems, UAS, such as a tethered UAS, a lighter than air, LTA, UAS, a heavier than air, HTA, UAS, and a high altitude UAS platform, HAP.

FIG. 2 is a schematic representation of an example of a wireless communication network 150 including a core network 152, a radio access network 154 having respective base stations/NTN gateways $154_1$ and $154_2$, and a plurality of spaceborne transceivers 156, like satellites, and/or airborne transceivers 158, like unmanned aircraft systems. The respective spaceborne or airborne transceivers 156, 158 may be implemented in respective spaceborne or airborne vehicles, like the above mentioned satellites or unmanned aircraft systems. The transceivers 156 and 158 are provided to serve one or more users, like the UE or the IoT device 110 shown in FIG. 2, which are provided on or above ground 160. The UE and the IoT device may be devices as described above with reference to FIG. 1. The arrows 1581 to 1584 schematically represent uplink/downlink connections for communicating data between the user UE, 110 and the respective transceiver 156, 158, also referred to as service links. The transceivers 156, 158 are connected to the core network 152 via the RAN entities $154_1$, $154_2$, via respective links $162_1$, $162_2$, also referred to as feeder links.

A NTN component may operate in accordance with the so called bent pipe or u-bend principle, sending back to earth what goes into the conduit with only amplification and a shift from uplink to downlink frequencies at the NTN component. Payload transmitted using this principle is also referred to as bent pipe payload or transparent payload. In accordance with other examples, a NTN component may use on-board processing so that the signal is demodulated, decoded, re-encoded and modulated aboard the NTN component. Payload transmitted using this principle is also referred to as regenerative payload.

It is noted that the information in the above section is only for enhancing the understanding of the background of the invention and therefore it may contain information that does not form the conventional technology that is already known to a person of ordinary skill in the art.

In a wireless communication network as described above, there may be a need for improvements in the determination/verification of a position of a UE.

SUMMARY

An embodiment may have an apparatus for verifying a position of a user device, UE, in a wireless communication network, the wireless communication network comprising a radio access network, RAN, a core network, CN, and a plurality of non-terrestrial network, NTN, components, wherein the apparatus is adapted to be located in a RAN entity or in a CN entity, and wherein the apparatus is adapted to
    receive from the UE a transmission of a request for connection to the wireless communication network via at least two different NTN components, the request comprising
        a UE reported position of the UE as determined by the UE, or
        a UE reported information indicative of a logical coarse location of the UE, or
        a UE reported measurement of one or more values indicative of a distance between the UE and the at least two different NTN components, and
    verify a position of the UE using network, NW, measured values indicative of a distance between the respective NTN components and the UE.

Another embodiment may have a user device, UE, for a wireless communication network, the wireless communication network comprising a radio access network, RAN, a plurality of non-terrestrial network, NTN, components and an apparatus for verifying a position of the UE using network, NW, measured values indicative of a distance between the respective NTN components and the UE, wherein the UE is adapted to send a transmission of a request for connection to the wireless communication network via at least two different NTN components, the request comprising
    a UE reported position of the UE as determined by the UE, or
    a UE reported information indicative of a logical coarse location of the UE, or
    a UE reported measurement of one or more values indicative of a distance between the UE and the at least two different NTN components.

Another embodiment may have a method for verifying a position of a user device, UE, in a wireless communication network, the wireless communication network comprising a radio access network, RAN, a core network, CN, and a plurality of non-terrestrial network, NTN, components, the method comprising: receiving, by an apparatus for verifying the position of the UE and being located in a RAN entity or in a CN entity, from the UE a transmission of a request for connection to the wireless communication network via at least two different NTN components, the request comprising
    a UE reported position of the UE as determined by the UE, or
    a UE reported information indicative of a logical coarse location of the UE, or
    a UE reported measurement of one or more values indicative of a distance between the UE and the at least two different NTN components, and
verifying, by the apparatus, a position of the UE using network, NW, measured values indicative of a distance between the respective NTN components and the UE.

BRIEF DESCRIPTION OF THE DRAWINGS

Embodiments of the present invention will be detailed subsequently referring to the appended drawings, in which:

FIG. 7 illustrates an embodiment of an information element, IE, TRP information item in accordance with an embodiment of the present invention;

FIG. 12 depicts an RRCSetupComplete message including a dedicated NAS message sent to a AMF from the UE;

FIG. 14 illustrates a possible means of reporting a UE position to a network;

DETAILED DESCRIPTION OF THE INVENTION

Embodiments of the present invention are now described in more detail with reference to the accompanying drawings in which the same or similar elements have the same reference signs assigned.

Figure 1A:
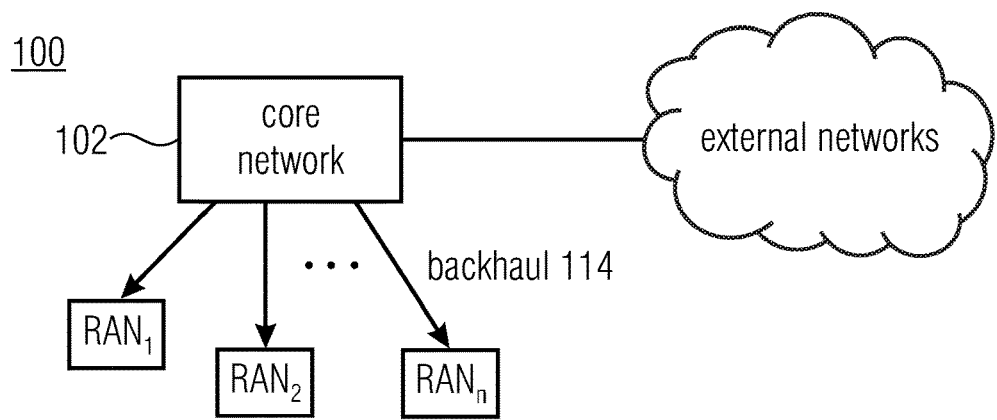
FIGS. 1(a) and 1(b) show a schematic representation of an example of a terrestrial wireless communication network.
Figure 1B:
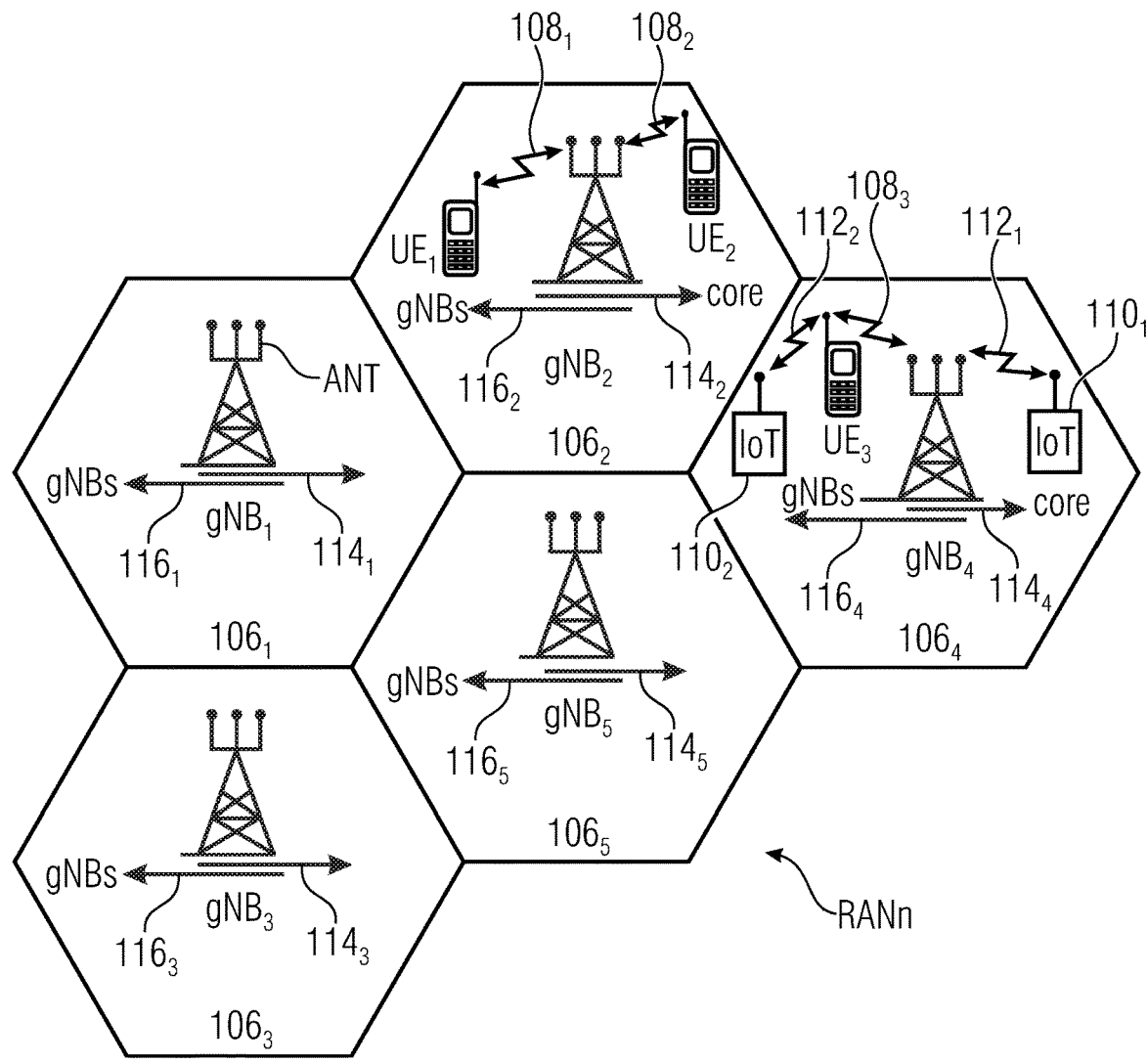
Figure 2:
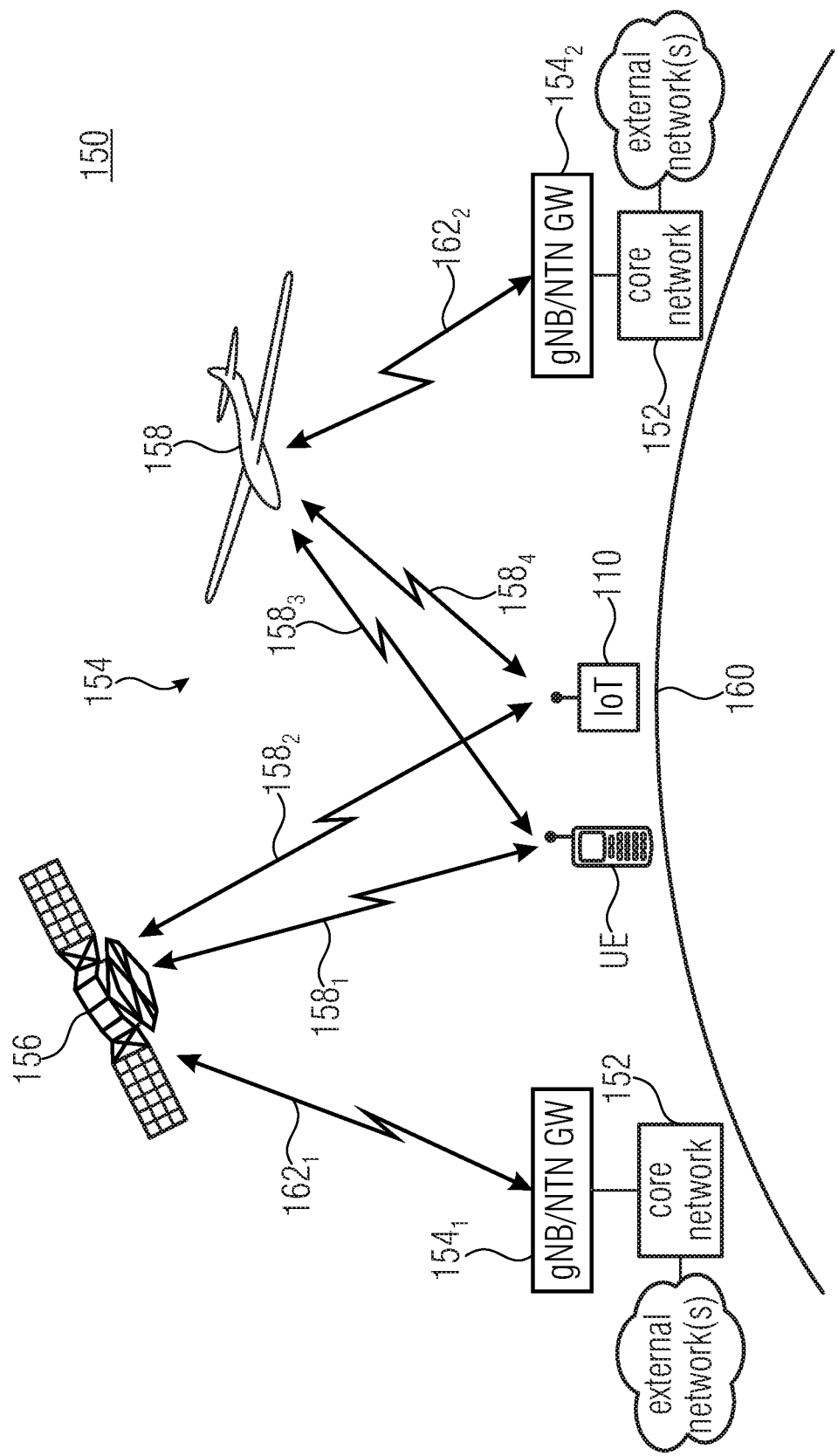
FIG. 2 is a schematic representation of an example of a non-terrestrial wireless communication network.

In wireless communication systems or networks as described above with reference to FIG. 1 and FIG. 2, determining a position of a UE within a certain geographical area covered by the network may be desired for various reasons. In accordance with conventional approaches, terrestrial networks may carry out a UE position determination using either wireless communication network signals, for example LTE signals up to Rel-15, like the Observed Time Difference Of Arrival, OTDOA, or the Enhanced Cell ID, E-CID, or NR signals for REL-16, like the Downlink Time Difference Of Arrival, DL-TDOA, the Downlink Angle of Departure DL-AoD, the Uplink Time Difference Of Arrival, UL-TDOA, the Uplink Angle of Arrival, UL-AoA, the Multi-Round Trip Time, Multi-RTT, or the New Radio Enhanced Cell ID, NR R-CID. Alternatively or in addition, positioning approaches using external systems, like an Assisted-Global Navigation Satellite System, A-GNSS, or a Terrestrial Beacon System, TBS, or systems supported by other networks, like a Wireless Local Access Network, WLAN, or Bluetooth, may be applied as well.

However, when it comes to wireless communication networks including at least some NTN components over which a UE communicates with the RAN, no positioning methods exist that make use of wireless communication network signals, like the above-mentioned LTE or NR signals. In other words, in terrestrial networks the transmission and reception points, TRPs, form the anchor. In case of NTN network, anchors are the satellites which are moving. In case of bent pipe architecture, there is no mechanism for determining the delay or attenuation between satellites and UE directly, as it necessitates the signal to be generated at the satellite or processed at the satellite itself.

Figure 3:
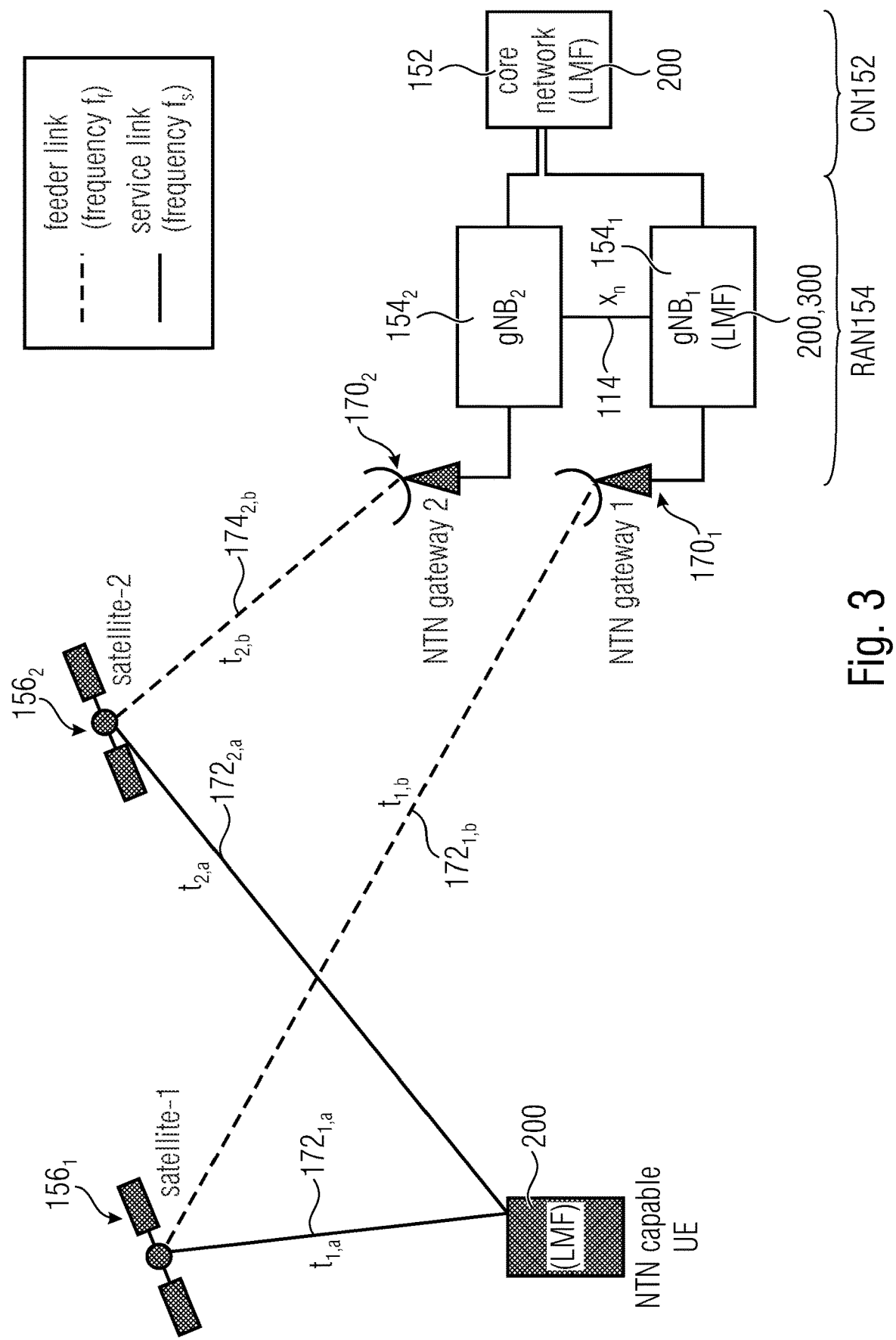
FIG. 3 illustrates an example of a wireless communication network including, as NTN components.

FIG. 3 illustrates an example of a wireless communication network including, as NTN components, the satellites $156_1$ and $156_2$. Further, two base stations, $gNB_1$ and $gNB_2$ are illustrated as example of access points or access nodes of the radio access network, RAN, of the wireless network which are connected to the core network 152. In the example depicted in FIG. 3, each of $gNB_1$ and $gNB_2$ includes a NTN gateway $170_1$ and $170_2$. Further, $gNB_1$ and $gNB_2$ may be connected via a backhaul link 114 using, for example, the Xn protocol. FIG. 3 further depicts a NTN capable UE that is connected via the satellites $156_1$ and $156_2$ to the RAN, more specifically to the $gNB_1$ and to the $gNB_2$, respectively. The UE is connected to the satellite $156_1$ via a first link $174_{1,a}$, also referred to as a service link operating at a frequency $f_s$, and to the satellite $156_2$ via the link $174_{2,a}$, also referred to as a service link operating at a frequency $f_s$. The satellites $156_1$ and $156_2$, in turn, are connected to the respective NTN gateways $170_1$ and $170_2$ by the links $174_{1,b}$ and $174_{2,b}$, also referred to feeder links operating at a frequency ff.

Satellites, like satellites $156_1$ and $156_2$ in FIG. 3, at a certain time, are located at a certain position given by respective coordinates, like $S_1(x_1, y_1, z_1)$, $S_2(x_2, y_2, z_2)$, ... $S_n(x_n, y_n, z_n)$. The position of the UE, namely UE(x,y,z), may be determined on the basis of the positions of the satellites to which the UE is connected and on the basis of the distance between the UE and the respective satellites in a known manner. The distance may be obtained on the basis of the delays $t_{1,a}$ and $t_{2,a}$ on the respective service links $172_{1,a}$ and $172_{2,a}$ between the UE and the satellites. In case the satellites $156_1$, $156_2$ make use of on-board processing, i.e., transmit regenerative payloads, the measurement of the delays $t_{1,a}, t_{2,a} \ldots t_{n,a}$ may be determined, in case of a downlink transmission, at the UE or, in case of an uplink transmission, at the respective satellite based on a corresponding measurement on the reference signals which, because they are processed on board by the satellite, when being received are associated, for example, with a time stamp from the satellite allowing the UE to determine the time or delay it took the signal to reach the UE thereby allowing to determine the distance between the UE and the satellite.

However, when processing so-called transparent payload, in accordance with which the reference signal is included in the baseband signal which is only repeated by the respective satellites, a measurement of the delay or an attenuation on the service link is not possible because it is incorporated within the baseband signal processed at the gNB that is located in the ground station. Thus, the reference signal, in a scenario as depicted in FIG. 3 in which the satellites $156_1$ and $156_2$ operate in accordance with the bent pipe principle for transmitting transparent payload, the reference signals are part of the payload that is transmitted to the satellite via the feeder link where the payload is amplified and/or frequency converted and sent over the service link to the UE. By correlating the received signal with the transmitted reference signal, the UE may only determine the delay or the attenuation on the link between the NG-RAN node, like $gNB_1$ or $gNB_2$ on the ground and the UE through the NTN components $156_1$ and $156_2$. Thus, in case of relaying data as transparent payload data by the satellites, the UE is only capable to determine the overall delays $t_1=t_{1,a}+t_{1,b}$ on the service and feeder links $172_{1,a}$ and $174_{1,b}$ as well as the delay $t_2=t_{2,a}+t_{2,b}$ on the service and feeder links $174_{2,a}$ and $174_{2,b}$. Additional delays on the on the service and feeder links may be considered, like the delay due to the repeater operation in the satellite and the delay due to the connections between the baseband processing unit and the antennas in the respective NTN gateway.

Thus, in such a scenario it is not possible to determine the position of the UE using reference signals transmitted in the actual radio signal, like the NR signal. For example, using the signaling and measurements defined in Rel. 16 of the 3GPP specifications is not possible. Conventionally, in such situations the UE needs to be provided with an additional transceiver circuitry, like a GNSS entity, capable of determining its position independent from reference signals.

In accordance with a first aspect of the present invention, the problem of not being able to determine a UE's position in a wireless communication network including NTN components using the wireless communication network position reference signals is addressed by the present invention.

In accordance with other scenarios, a UE, like the UE depicted in FIG. 3, may wish to make a connection to the wireless communication network via the respective satellites. Together with the request, the UE may signal its geographical location. For example, the geographical location may be determined by the UE with a certain degree of uncertainty, for example, depending on the number of anchors involved and/or depending on the quality or reliability of the measurements carried out, for example, by the UE. In case the measurement quality decreases, also the accuracy of the position decreases. Thus, there may be situations in which a position indicated by the UE requesting access to a network does not have sufficient accuracy and, therefore, needs to be verified for example, to make sure that appropriate measures may be taken when establishing the connection, e.g., that a correct Public Land Mobile Network, PLMN, is selected when a satellite beam spans more than one country or when the span of the satellite beam changes. So far, there is no process for implementing a verification of a UE position for the UE requesting access to a wireless communication network including NTN components.

In accordance with a second aspect of the present invention, an approach is provided allowing for a verification of a UE's position when the UE requests access a connection to a wireless communication network including NTN components.

Apparatus-1. Aspect

The present invention provides (see for example claim 1) an apparatus for determining a position of a user device, UE, of a wireless communication network, the wireless communication network including a radio access network, RAN, and a plurality of non-terrestrial network, NTN, components, like an airborne vehicle or a spaceborne vehicle, operating on a bent pipe principle for a transmission between the UE and the RAN, wherein the apparatus is to
receive
  for bent pipe transmissions between the UE and the RAN via at least two different NTN components respective values indicative of a distance between the UE and the RAN, or
  one or more Doppler values for each link between the UE and the at least two NTN components.
obtain positions of the at least two NTN components, and
determine the position of the UE using the obtained positions of the at least two NTN components and the values or one or more Doppler values.

In accordance with embodiment (see for example claim 2) the apparatus is to
receive for bent pipe transmissions between the UE and the RAN via at least two different NTN components respective first values indicative of a distance between the UE and the RAN,
obtain a position of the at least two NTN components,
determine, for each of the at least two NTN components, one or more second values indicative of a distance between the UE and the NTN component using the one or more first values and a distance between the RAN and the NTN component, and
determine the position of the UE using the obtained positions of the at least two NTN components and the determined distances between the UE and the at least two NTN components.

In accordance with embodiment (see for example claim 3) the apparatus is to
receive for bent pipe transmissions between the UE and the RAN via at least two different NTN components one or more Doppler values for each link between the UE and the at least two NTN components,
obtain a position of the at least two NTN components,
determine, for each of the at least two NTN components, a distance between the UE and the NTN component using the one or more Doppler values, and
determine the position of the UE using the obtained positions of the at least two NTN components and the determined distances between the UE and the at least two NTN components.

In accordance with embodiment (see for example claim 4) the first and second values include one or more of:
  timing values, e.g., a time of arrival, ToA, a Time Difference of Arrival, TDoA, a Round Trip Time, RTT, or a multi-RTT measured at an antenna, at an antenna connector or at an antenna reference point of the UE or the RAN,
  signal strength values, e.g., a Reference Signal Received Power, RSRP, or a Received Signal Strength Indicator, RSSI, measured at an antenna, at an antenna connector or at an antenna reference point of the UE or the RAN.

In accordance with embodiment (see for example claim 5) the first and second values include timing values,
the apparatus is to obtain, in addition to the position of the at least two NTN components, one or more of the following:
  a location of an antenna, an antenna connector or an antenna reference point connected to a baseband processing unit of the UE or the RAN or the NTN component,
  a processing delay at each of the at least two NTN components,
  a feeder link delay between the NTN component and the RAN,
  a service link delay between the NTN component and UE, a connection delay of a connection between of a baseband processing unit and an antenna, an antenna connector or an antenna reference point of the UE or the RAN or the NTN component, and the apparatus is to determine the second values indicative of the distance between the UE and the NTN component further using one or more of the location, the processing delay, the feeder link delay, the service link delay and the connection delay.

In accordance with embodiment (see for example claim 6) the apparatus is to obtain the location from one or more of the following:
- an Operation and Maintenance, O&M, mechanism of the wireless communication network,
- a RAN node providing a baseband signal to an NTN gateway,
- a satellite operator via any interface between a satellite operator and a NG-RAN node, a CN or other communication interfaces and databases.

In accordance with embodiment (see for example claim 7) the first and second values include signal strength values, the apparatus is to obtain, in addition to the position of the at least two NTN components, one or more of the following:
- a location of an antenna, an antenna connector or an antenna reference point connected to a baseband processing unit of the UE or the RAN,
- signal attenuation on a feeder link between the NTN component and the RAN,
- signal attenuation of a connection between a baseband processing unit and an antenna, an antenna connector or an antenna reference point of the UE or the RAN, and
- signal attenuation on a service link between the NTN component and UE, the apparatus is to determine the distance between the UE and the NTN component further using one or more of the location, the signal attenuation on the feeder link, the signal attenuation on the service link and the signal attenuation on the.

In accordance with embodiment (see for example claim 8) one or more of the following is provided, e.g., to a RAN-node or to the UE, by the apparatus or by a RAN-node
- the processing delays,
- the feeder link delay,
- the service link delay,
- the connection delay
- signal attenuation on the feeder link,
- signal attenuation on the service link,
- signal attenuation of the connection, to an entity, like the UE or the RAN, which measures the one or more first values indicative of the distance between the UE and the RAN, so that the entity, when receiving the assistance data, may use the assistance data to adjust the measurement of the one or more first values.

In accordance with embodiment (see for example claim 9) the signal attenuation is indicted by pathloss parameters like a pathloss exponent, a correction, a log-normal shadowing, an applicable channel model, and the like.

In accordance with embodiment (see for example claim 10) the Doppler values are measured by the UE and/or by the respective NTN components.

In accordance with embodiment (see for example claim 11) the apparatus is to send a measurement request to the UE and/or to the respective NTN components to measure the Doppler.

In accordance with embodiment (see for example claim 12) the measurement request includes one or more the following;
- the NR-ARFCN or the carrier-frequency where the measurement is to be made,
- a PRS configuration including at least a PRS-ID
- a time/frequency location of the PRS signal.

In accordance with embodiment (see for example claim 13) the apparatus is to receive from the UE or from the respective NTN components, in addition to the Doppler values, the NR-ARFCN or the frequency where the measurement of the Doppler values was made.

In accordance with embodiment (see for example claim 14) the apparatus is to obtain a position of the at least two NTN components by one or more of the following:
- using the Operation and Maintenance, O&M, mechanism of the wireless communication network,
- interacting with an external server providing data for orbital parameters of the NTN components,
- requesting the positions of the NTN components from an operator of the NTN components,
- requesting the positions of the NTN components from an operator of the RAN.

In accordance with embodiment (see for example claim 15) the apparatus is to obtain the position of the at least two NTN components responsive to receiving information, e.g., from the RAN or from the Operation and Maintenance, O&M, mechanism of the wireless communication network, that the RAN serves the UE through the non-terrestrial components.

In accordance with embodiment (see for example claim 16) the apparatus is located or implemented
- at the UE,
- at the RAN,
- at a core network, CN, of the wireless communication network, e.g., by a Location Management Function, LMF.

The present invention provides an apparatus for verifying a position of a user device, UE, in a wireless communication network, the wireless communication network including a radio access network, RAN, and a plurality of non-terrestrial network, NTN, components, like an airborne vehicle or a spaceborne vehicle, wherein the apparatus is located in the RAN, e.g., at a RAN node, and wherein the apparatus is to
- receive from the UE a transmission of a request for connection to the wireless communication network via at least two different NTN components, the request including
  - a UE reported position of the UE as determined by the UE, or
  - a UE reported information indicative of a logical coarse location of the UE (e.g. mapped cell, selectedPLMNIdentity, TAC, TAI), or
  - a UE reported measurement of one or more values indicative of a distance between the UE and the at least two different NTN components, and
- verify a position of the UE using network, NW, measured values indicative of a distance between the respective NTN components and the UE.

In accordance with embodiment the apparatus is to
- receive from the UE a transmission of a request for connection to the wireless communication network via at least two different NTN components, the request including a UE reported position of the UE as determined by the UE,
- obtain for each transmission one or more first values indicative of a distance between the UE and the RAN, obtain a position of the at least two NTN components,
determine, for each of the at least two NTN components, second values indicative of a distance between the UE and the NTN component using the one or more first values and a distance between the RAN and the NTN component,
obtain a network, NW, computed position of the UE using the obtained positions of the at least two NTN components and the determined distances between the UE and the at least two NTN components, and
verify the UE reported position in case UE reported position deviates from the NW computed position by less than a certain amount, or send the UE reported position and the NW computed position to a core network, CN, of the wireless communication network for the verification.

Apparatus—2. Aspect

In accordance with embodiment the apparatus is to
receive from the UE a transmission of a request for connection to the wireless communication network via at least two different NTN components, the request including a UE reported measurement of one or more first values indicative of a distance between the UE and the at least two different NTN components,
obtain for each transmission a network, NW, measurement of one or more second values indicative of a distance between the UE and the NTN component,
verify the UE reported measurement in case UE reported measurement deviates from the NW measurement by less than a certain amount, or send the UE reported measurement and the NW measurements to a core network, CN, of the wireless communication network for the verification.

In accordance with embodiment the apparatus is to
receive from the UE a transmission of a request for connection to the wireless communication network via at least two different NTN components, the request including a UE reported position of the UE as determined by the UE,
obtain for each transmission one or more Doppler values for each link between the UE and the at least two NTN components,
obtain a position of the at least two NTN components,
determine, for each of the at least two NTN components, a distance between the UE and the NTN component using the one or more Doppler values,
obtain a network, NW, computed position of the UE using the obtained positions of the at least two NTN components and the determined distances between the UE and the at least two NTN components, and
verify the UE reported position in case the UE reported position deviates from the NW computed position by less than a certain amount, or send the UE reported position and the NW computed position to a core network, CN, of the wireless communication network for the verification.

In accordance with embodiment the apparatus or the CN is to allow the UE to connect to the wireless communication network only when the UE reported position is verified.

In accordance with embodiment the apparatus is to signal to a core network, CN, of the wireless communication network one or more of the following:
a flag indicating whether the UE reported location is to be trusted by entities in the CN,
a flag indicating that the UE reported location has been verified by the apparatus,
one or more parameters describing a deviation of the UE-reported position from the NW computed position,
one or more parameters describing a reliability of the process determining the UE reported location and/or the NW computed position,
one or more parameters describing a reliability of measurements used in the process determining the UE reported location and/or the NW computed position.

In accordance with embodiment the apparatus is to signal to the UE and/or to the RAN node to use a certain integrity method and report the results.

In accordance with embodiment the apparatus is to receive from the CN a threshold by which the UE reported position is allowed to deviate from the NW computed position.

In accordance with embodiment the NTN component includes one of more of
a spaceborne vehicle, like a satellite or a space vehicle at a specific altitude and orbital period or plane, e.g., a low earth orbit (LEO), a medium earth orbit (MEO), a geosynchronous orbit (GSO), a geostationary orbit (GEO), or a high earth orbit (HEO), and
an airborne vehicle, like an unmanned aircraft system (UAS), e.g., a tethered UAS, a lighter than air UAS (LTA), a heavier than air UAS (HTA) and a high altitude UAS platforms (HAPs).

The present invention provides a user device, UE, for a wireless communication network, the wireless communication network including a radio access network, RAN, and a plurality of non-terrestrial network, NTN, components, like an airborne vehicle or a spaceborne vehicle, and providing a plurality of reference points, each reference points representing a geographical location and being mapped to one or more network parameters, like at least one PLMN and/or at least one TAC and/or at least one NR-CGI and/or at least one mapped NR-CGI,
wherein to determine one or more network parameters, e.g., a PLMN and/or a Tracking Area Code, TAC, and/or a NR-CGI, applicable to the UE at a current location of the UE, the UE is to
receive assistance data indicating a location of some or all of the plurality of reference points,
determine from the plurality of reference points a reference point closest to the current location of the UE, and
derive the network parameters mapped to the closest reference point, and
wherein the UE is to
initiate one or more signaling procedures, e.g., a UE registration, a TAC update, etc., using the derived network parameters, or
report an identifier of the closest reference point, and/or information derived from the assistance data corresponding to such identifier provided to the UE, e.g., when initiating a connection or when performing a TAC update or when initiating any other signaling procedure to the network, so as to allow verification of a location reported by the UE by wireless communication the network.

In accordance with embodiment the UE is to initiate a UE registration procedure for accessing a certain PLMN by sending a REGISTRATION REQUEST.

In accordance with embodiment, responsive to the REGISTRATION REQUEST, the UE is to receive a REGISTRATION ACCEPT or a REGISTRATION REJECT, dependent on whether the UE is allowed to access the PLMN.

In accordance with embodiment the UE is to receive
the REGISTRATION ACCEPT if it is determined that the current location of the UE is in a country where the certain PLMN is allowed to operate, and
the REGISTRATION REJECT if it is determined that the current location of the UE is in a country where the certain PLMN is not allowed to operate.

In accordance with embodiment the UE is to determine the current location of the UE using A-GNSS and to report a A-GNSS position with a message ProvideLocationInformation within a LPP signaling so as to allow the wireless communication network to use the reported A-GNSS position instead of a network-based positioning method, such as multi-RTT or UL-TDOA.

Method—1. Aspect

The present invention provides a method for operating an apparatus for determining a position of a user device, UE, of a wireless communication network, the wireless communication network including a radio access network, RAN, and a plurality of non-terrestrial network, NTN, components, like an airborne vehicle or a spaceborne vehicle, operating on a bent pipe principle for a transmission between the UE and the RAN, the method comprising:
  receiving
    for bent pipe transmissions between the UE and the RAN via at least two different NTN components respective values indicative of a distance between the UE and the RAN, or
    one or more Doppler values for each link between the UE and the at least two NTN components.
  obtaining positions of the at least two NTN components, and
  determining the position of the UE using the obtained positions of the at least two NTN components and the values or one or more Doppler values.

Method—2. Aspect

The present invention provides a method for operating an apparatus for verifying a position of a user device, UE, in a wireless communication network, the wireless communication network including a radio access network, RAN, and a plurality of non-terrestrial network, NTN, components, like an airborne vehicle or a spaceborne vehicle, wherein the apparatus is located in the RAN, e.g., at a RAN node, the method comprising:
  receiving from the UE a transmission of a request for connection to the wireless communication network via at least two different NTN components, the request including
    a UE reported position of the UE as determined by the UE, or
    a UE reported measurement of one or more values indicative of a distance between the UE and the at least two different NTN components, and
  verifying a position of the UE using network, NW, measured values indicative of a distance between the respective NTN components and the UE.

The present invention provides a method for operating a user device, UE, for a wireless communication network, the wireless communication network including a radio access network, RAN, and a plurality of non-terrestrial network, NTN, components, like an airborne vehicle or a spaceborne vehicle, and providing a plurality of reference points, each reference points representing a geographical location and being mapped to one or more network parameters, like at least one PLMN and/or at least one TAC and/or at least one NR-CGI and/or at least one mapped NR-CGI, the method comprising:
  determining, Area Code, TAC, by the and/or UE, one tracking or more area network identifier parameters, (TAI) and/or e.g., a a NR-CGI, PLMN and/or applicable a Tracking to the UE at a current location of the UE, by
    receiving assistance data indicating a location of some or all of the plurality of reference points,
    determining from the plurality of reference points a reference point closest to the current location of the UE, and
    deriving the network parameters mapped to the closest reference point,
  wherein the method further comprises:
    initiating one or more signaling procedures, e.g., a UE registration, a TAC update, etc., using the derived network parameters, or
    reporting an identifier of the closest reference point, e.g., when initiating a connection or when performing a TAC update or when initiating any other signaling procedure to the network, so as to allow verification of a location reported by the UE by wireless communication the network.

Computer Program Product

Embodiments provide a computer program product comprising instructions which, when the program is executed by a computer, causes the computer to carry out one or more methods in accordance with the present invention.

First Aspect

In accordance with a first aspect of the present invention an approach is provided allowing a UE position to be determined in situations in which the position reference signals are transmitted within a NTN wireless communication network as transparent payload via the respective NTN components so that the UE or a RAN node may only determine, on the basis of the received positioning reference signals, the overall time or delay for transmitting the signal between the radio access network and the UE via the satellite, or the overall attenuation of the signal when transmitted between the radio access network and the UE via the satellite.

Figure 4:
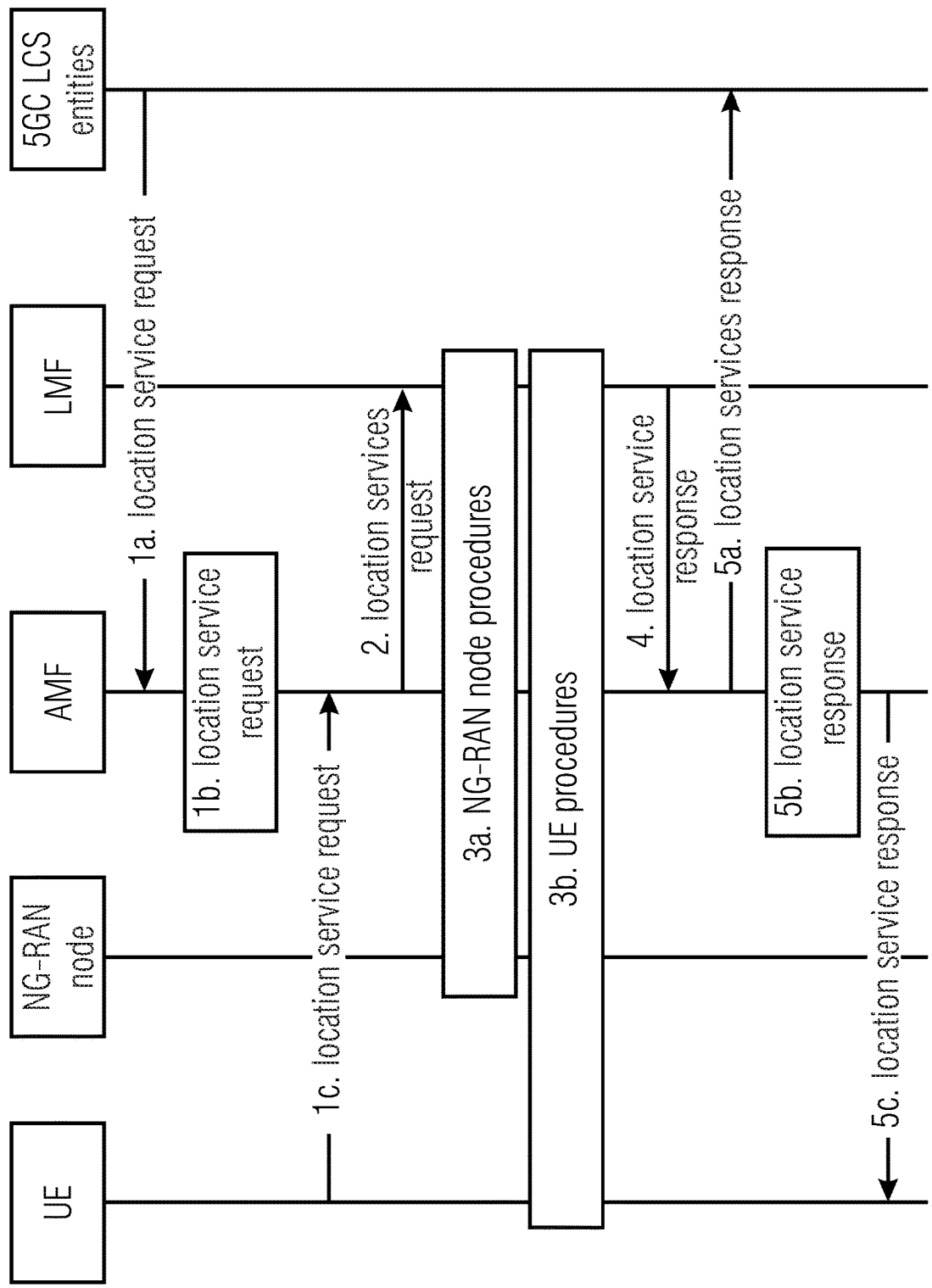
FIG. 4 illustrates the respective steps involved in supporting location services, LCS, in the 5G core, 5GC, by a NG-RAN according to TS 38.305 Rel. 16.

FIG. 4 illustrates the respective steps involved in supporting location services, LCS, in the 5G core, 5GC, by a NG-RAN according to TS 38.305 Rel. 16. The steps as described in TS 38.305 are as follows:
1. A location service is requested, e.g.,
  1a. an entity in the 5GC, e.g., a Gateway Mobile Location Center, GMLC, requests a location service, like positioning for a target UE to the serving Access and Mobility Function, AMF, or
  1b. the serving AMF for a target UE determines the need for some location service, e.g., to locate the UE for an emergency call, or
  1c. the UE requests some location service, e.g., positioning or delivery of assistance data, to the serving AMF at the Non Access Stratum, NAS, level.
2. The AMF transfers the location service request to a Location Management Function, LMF.
3a. The LMF instigates location procedures with the serving and possibly neighbouring NG-eNB or gNB in the NG-RAN—e.g. to obtain positioning measurements or assistance data.
3b. In addition to step 3a or instead of step 3a, the LMF instigates location procedures with the UE—e.g. to obtain a location estimate or positioning measurements or to transfer location assistance data to the UE.
4. The LMF provides a location service response to the AMF and includes any needed results—e.g. success or failure indication and, if requested and obtained, a location estimate for the UE.

5a. If step 1a was performed, the AMF returns a location service response to the 5GC entity and includes any needed results—e.g. a location estimate for the UE.

5b. If step 1b was performed, the AMF uses the location service response received in step 4 to assist the service that triggered this in step 1b, e.g., the AMF may provide a location estimate associated with an emergency call to a GMLC.

5c. If step 1c was performed, the AMF returns a location service response to the UE and includes any needed results—e.g. a location estimate for the UE.

The above steps are associated with terrestrial networks, and by employing such a RAT-based positioning technique, the position of the UE may be estimated quite accurately. In case of NTN components, as mentioned above, the UE may not be able to rely on the respective positioning signals obtained by the baseband signal, rather, an external system, like the A-GNSS, needs to be employed for determining the position of the UE. The reason is that in case of a NTN component operating in accordance with the bent pipe principle, i.e., transmitting transparent payload, the baseband signal that includes the positioning reference signals is generated or measured at the baseband signal processing unit located on the ground, namely at the UE or at the RAN, more specifically at one of the base stations of the RAN. When the receiver, for example the UE in the downlink case, or the NR-RAN in the uplink case, correlates a received positioning reference signal with a copy of the positioning reference signal a delay may be measured by the receiver which is the total delay observed on the signal received via the non-terrestrial component, like satellite $156_1$ in FIG. 3. Thus, the total delay $t_1 = t_{1,a} + t_{1,b} + \Delta_1$, with $t_{1,a}$ and $t_{1,b}$ being the delays on the respective service and feeder links $172_{1,a}$ and $174_{1,b}$, and with $\Delta_1$ being the delay due to the repeater operation in the satellite $156_1$, and the delay due to the connections between the baseband processing unit and the antennas in the respective NTN gateway $170_1$. Likewise, the total delay observed on the signal received via the satellite $156_2$ is $t_2 = t_{2,a} + t_{2,b} + \Delta_2$, with $t_{2,a}$ and $t_{2,b}$ being the delays on the respective service and feeder links $172_{2,a}$ and $174_{2,b}$, and with $\Delta_2$ being the delay due to the repeater operation in the satellite $156_2$, and the delay due to the connections between the baseband processing unit and the antennas in the respective NTN gateway $170_2$.

Thus, on the basis of the measured delay, a positioning determining apparatus, like a location management function, LMF, in the core network or a position computing entity provided at the UE or a position computing and/or coordinating entity at the RAN has no knowledge about the actual distance between the satellite and the UE so that no determination of the position of the UE may be obtained from two or more transmissions of the PRS via different satellites even when the satellite position is known.

Figure 6:
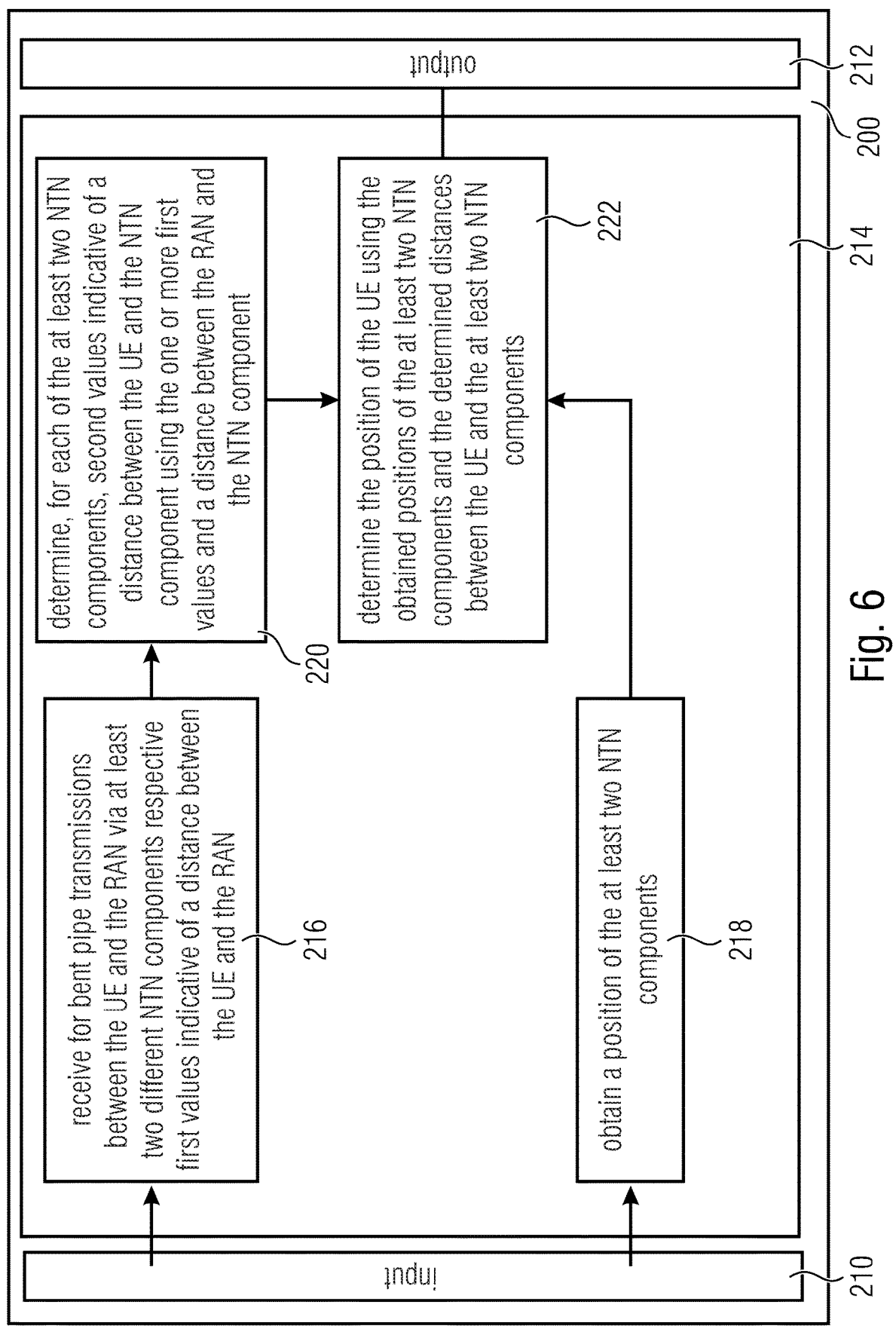
FIG. 6 illustrates a first embodiment of an apparatus for determining a position of a user device in accordance with the first aspect of the present invention.

The present invention addresses this problem and, in accordance with embodiments of a first aspect, provides an improved apparatus for determining a position of a user device. FIG. 6 illustrates an embodiment of an apparatus 200 for determining a position of a user device in accordance with the first aspect of the present invention. In accordance with embodiments, the inventive approach may operate in accordance with the positioning procedure according to TS 38.305 described above with reference to FIG. 4 and, basically, affects step 3 and step 4, where the LMF interacts with the NG-RAN node and the UE to obtain required measurements.

Figure 5:
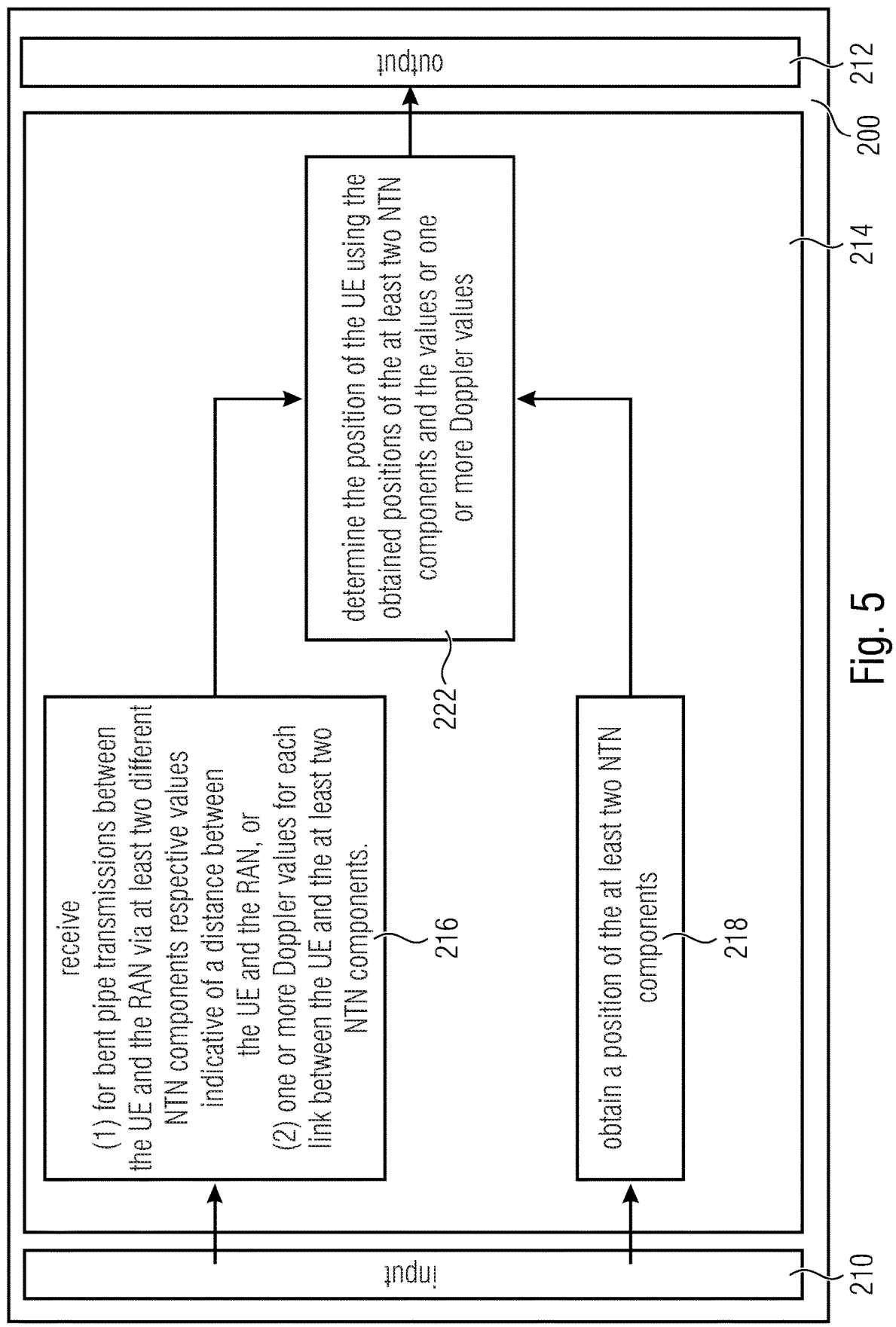
FIG. 5 illustrates an apparatus for determining a position of a user device in accordance with embodiments of a first aspect of the present invention.

FIG. 5 illustrates an apparatus for determining a position of a user device in accordance with embodiments of the first aspect of the present invention. The apparatus 200, like a LMF or a position computing entity, is provided for determining a position of a user device, UE, of a wireless communication network, like the network described above with reference to FIG. 3 including a radio access network and two or more non-terrestrial network components. The apparatus 200, in accordance with embodiments, includes an input 210, an output 212 and a signal processor 214. The apparatus 200 receives 216 for bent pipe transmissions between the UE and the RAN via at least two different NTN components respective first values indicative of a distance between the UE and the RAN, or one or more Doppler values for each link between the UE and the at least two NTN components. Further, the apparatus 200 obtains 218 a position of the NTN components and determines 222 the position of the UE using the obtained positions of the at least two NTN components and the first values or one or more Doppler values.

FIG. 6 illustrates a first embodiment of the apparatus 200. The apparatus 200 receives 216, for example via the input 210, one or more first values indicative of a distance between the UE and the radio access network, for example a distance between the UE in FIG. 3 and the two base stations $gNB_1$, $gNB_2$ or the associated NTN gateways $170_1$, $170_2$. The values are obtained by measurements of bent pipe transmissions between the UE and the RAN via at least two different NTN components, like the satellites $156_1$ and $156_2$, i.e., the transmissions are only received and forwarded by the NTN components. Further, the apparatus 200 obtains 218 a position of the NTN components for which the measurements were received, for example the positions of the satellites $156_1$ and $156_2$ in FIG. 3. The positions may be obtained from an external entity, like the satellite operator or the Operation and Maintenance, O&M, mechanism of the wireless communication network, via the input 210, or from a storage of the apparatus holding positions of the satellites employed by the wireless communication network.

The apparatus 200 may be aware of a distance between the RAN, like the respective gNBs, and the respective NTN components, for example the distance between the satellite $156_1$ and the first NTN gateway $170_1$, and the distance between the second NTN gateway $170_2$ and the second satellite $156_2$, for example on the basis of the position of the NTN gateways and on the basis of the positions obtained for the respective satellites. Based on this known distance between the RAN and the NTN components and the overall distances between the UE and the RAN via the different NTN components, the apparatus determines 220 for each NTN component one or more second values indicative of the distance between the UE and the NTN component, for example in case of ToA values by subtracting from the measured delay $t_1$ the known delay for the signal propagation $t_{1,b}$ between the NTN gateway $170_1$ and the satellite $156_1$ which yields the propagation delay $t_{1,a}$ on the link between the UE and the satellite $156_1$. This allows determining the distance between the UE and the satellite $156_1$. Based on the determined distances between the UE and the NTN components and based on the obtained positions of the NTN components, the apparatus 200 determines 222 the position of the UE. The position of the UE may be output to other entities of the network via the output 212 of the apparatus 200.

It is noted that the present invention is not limited to ToA measurements for obtaining the delay and determining on the basis thereof the respective distances, rather, in accordance with further embodiments, TDoA measurements for obtaining Reference Signal Time Differences, RSTDs, may be used for determining the respective distances. Thus, in addition to ToA or pseudorange measurements using Doppler values, also UL-TDOA, DL-TDOA relying on UL/DL-RSTD measurements may be employed. For example: the RSTD may be computed between the UE and two satellites.

The measured values received may be obtained by the apparatus 200 from the UE, in case of a transmission of downlink positioning reference signals evaluated at the UE for the positioning mechanism, or there may be received from an NG-RAN node, like gNB; and $gNB_2$ in FIG. 3, in case the UE sends the positioning reference signals via different satellites, for example uplink positioning reference signals.

Thus, in accordance with embodiments of the present invention, an apparatus, like a LMF or a position computing and/or entity, obtains measurements from an NG-RAN node and/or from a UE, dependent on the positioning method used. The NG-RAN node or the UE simply report the timing values or signal strength values needed for computing, for example, ToA, TDoA, RTT, RSRP, RSSI or multi-RTT as specified, for example, in Rel. 16. The values may be measured at an antenna connector or at an antenna reference point of the receiver, namely the UE or the RAN node. The apparatus further obtains the position of the satellites, for example using the O&M mechanism from the network or by interacting with an external server providing data for the orbital parameters of the satellites. Also, the operator of the satellite may provide the position obtained either from its control system or via the satellite to the apparatus.

In case the apparatus is not located at the NTN-gateway or in case the position of the NTN gateway is not known, in accordance with further embodiments, the location of the NTN-gateway may be provided to the LMF of to the position computing entity by the O&M mechanism or by obtaining the information from the NG-RAN node associated with the respective NTN-gateway and providing the baseband signal including the positioning reference signals to the NTN-gateway. The location of the NTN gateway may be a reference point on a ground station. As an example, this may be the physical center of an antenna, location of the antenna connector at the NTN gateway, a phase center of the antenna or phase center of antenna array of the NTN gateway, physical center of the antenna and similar.

In accordance with further embodiments, the timing or delay values or the strength values may be calibrated before they are provided to the apparatus or they may be calibrated at the apparatus. The measurements may be calibrated, by the apparatus, by the UE or by the NG-RAN taking into account the location of the satellites and the location of the gateway and, in accordance with further embodiments, also other available delay values, like delays on the cables connecting the baseband processing unit to the NTN gateway.

The apparatus, as mentioned above, estimates the delay $t_{1,b}$ (see FIG. 3) between the NTN gateway $170_1$ and the satellite $156_1$ based on the position of the satellite and the NTN gateway and subtracts this estimate from the measured delay $t_1$ reported by the receiver thereby yielding the delay $t_{1,a}$ on the link between the receiver and the satellite allowing for the estimation of the distance which is finally used for determining the position of the UE. The same is performed for the link between the UE and the satellite $156_1$ for obtaining the delay $t_{2,a}$.

In accordance with other embodiments, instead of the delay of the signals, also an attenuation of the signal including the positioning reference signal may be determined. An attenuation on the link between the NTN gateway and the satellite is estimated so that, when subtracting it from the overall attenuation, the attenuation on the service link between the UE and the satellite is obtained allowing for an estimation of the distance.

The above steps are carried for the two or more satellites so as to obtain at least two distance values on the basis of which, in combination with known positions of the satellites, the position of the UE, like its geographical position, may be determined.

With regard to the first embodiment, it is noted that the transmission of the positioning signals via at least two satellites or NTN components may originate from a single gNB which transmits the baseband signal via at least two different NTN gateways to different satellites, with the positioning reference signals being advantageously identified as being transmitted either over the first satellite or the second satellite so that the different delays/attenuations over the links may be determined. In accordance with other embodiments, like the one depicted in FIG. 3, the positioning reference signals may be provided by different base stations and marked as originating from the different base stations so they may be differentiated at the UE when transmitted via different NTN gateways and different satellites. Thus, in accordance with embodiments, one gNB may provide a connection via one NTN gateway, which has a feeder link with one or more satellites, and the gNBs serving the different feeder links may have Xn interfaces. In accordance with embodiments, one gNB may provide a connection via one or more NTN gateways, each of which may have feeder link to one or more satellites.

The inventive apparatus 200 may be located at one or more parts of the overall network, for example, in the core network 152, in the RAN 154, in the satellite 156, or in the UE, as is also schematically illustrated in FIG. 3. Dependent on where the apparatus is located, it may be desired or necessary to provide additional information, like the location of the antenna of the NTN gateway, which connects to the baseband unit performing the physical layer processing, like the RAN notes $gNB_1$ or $gNB_2$. Also, the processing delay at the satellite when the signal is transmitted from the feeder link to the service link or from the service link to the feeder link, the propagation delay or attenuation on the feeder link and the service link as well as a delay on cables connecting the baseband processing unit to the NTN gateway may be signaled so as to the taken into account when estimating the attenuation or delay from the RAN node to the satellite that is to be subtracted from the overall delay for determining the delay or attenuation on the service link between the UE and the satellite.

For example, when the apparatus is located at the UE or at the core network, the apparatus also receives the information about the location of the respective antenna or NTN gateways connecting the RAN to the two or more satellites so that also the delay or attenuation on the respective feeder links may be estimated on the basis of the satellite and NTN gateway positions signaled to the apparatus. When the apparatus is located at the RAN, for example at a certain gNB, the positions of NTN gateways associated with the gNB may be known already, so that, if needed at all, only NTN gateway position information from other gNBs may be received at the apparatus.

Thus, for addressing the problems encountered in conventional positioning approaches in networks including NTN components and transmitting reference signals as transparent payload via the NTN components, embodiments of the first aspect of the present invention provide one or more of the following:
1) extra signaling to determine and/or convey the position of satellites to the LMF or position computing entity,
2) extra signaling to determine and/or convey the position of NTN gateway,
3) information to the UE whether the gNB hosting the TRP sending the downlink positioning reference signal or receiving the uplink positioning reference signal is using a transparent or regenerative architecture,
4) information to the LMF or position computing entity whether the gNB is based on the ground and whether the satellite is a transparent relay or whether the gNB is on board the satellite,
   a. this may be needed to ensure that the LMF or position computing entity provides suitable assistance data to the UE for measuring the positioning signals, e.g., the Synchronization Signal Block, SSB, the Downlink Positioning Reference Signal, DL-PRS, the Channel-State Information Reference Signals, CSI-RS, or the Phase Tracking Reference Signal, PTRS, and/or for sending positioning reference signals, e.g., the Sounding Reference Signal, SRS,
   b. this may also be needed to remove or take into account extra delay due to the feeder link, the processing delay, the cable delays, and the like.

As mentioned above, in accordance with embodiments, each NG-RAN node, like $gNB_1$ or $gNB_2$, when providing the baseband signal including the position reference signals to the NTN-gateway, may also provide to the apparatus 200 the location of the antenna and/or the phase center of the antenna array of the gateway using, for example, the information element, IE, NG-RAN Access Point Position for providing the coarse position of NG-RAN node, or the IE NG-RAN High Accuracy Access Point Position for providing a highly accurate position of the NG-RAN node within the IE TRP information item as defined in TS 38.455. In accordance with embodiments of the present invention, the IE TRP information item includes information that the TRP is not a terrestrial part, but is connected to a NTN component of the network, for example, by adding a field NTN gateway to the IE TRP information item indicating whether the TRP is a NTN gateway or not. FIG. 7 illustrates an embodiment of a TRP information item in accordance with an embodiment of the present invention which, in addition to the conventional entries includes in the last line the entry NTN gateway which is a Boolean value indicating whether the TRP, i.e., the $gNB_1$ or $gNB_2$, is part of a wireless communication network including NTN components, i.e., is a NTN gateway (1) or no NTN gateway (0).

The apparatus 200, in accordance with embodiments of the first aspect of the present invention, may receive information that the NG-RAN serves a UE through one or more NTN components. This information may be received, for example, via the above-mentioned IE TRP information item indicating in the last line (see FIG. 7) that $gNB_1$ and $gNB_2$ are NTN gateways, or via the O&M mechanism of the network. Responsive to the information that the NG-RAN serves the UE through the NTN component, the apparatus 200 may signal to the NG-RAN node to provide the orbital parameters, like the ephemeris, or the location of the NTN component. In accordance with other embodiments, the apparatus 200 may compute the position based on orbital parameters available from the O&M mechanism or from an external server, for example using the two-line element, TLE. In response to the request from the apparatus, the NG-RAN may provide the ephemeris, which is typically expressed by the TLE format, as described, for example, in R2-1916391 3GPP TSG-RAN WG2 Meeting #108 Reno, US Nov. 18-22, 2019. The NG-RAN node may obtain the information from the satellite operator or may have the information already stored. The typical orbital parameters need include at least one or more of the following:
   Epoch
   First Derivative of Mean Motion aka the Ballistic Coefficient
   Second Derivative of Mean Motion
   Drag Term also known as Radiation Pressure Coefficient or BSTAR (decimal point assumed)
   Inclination
   Right Ascension of the Ascending Node
   Eccentricity
   Argument of Perigee (degrees)
   Mean Anomaly (degrees)
   Mean Motion (revolutions per day)
   Revolution number at epoch (revolutions)

The information may be provided as TLE or as fields within an IE in an RRC and/or LPP and/or NRPPa message or in any other system message.

In accordance with further embodiments, the apparatus may provide assistance data to the entity determining the measured values, like the timing values or signal strength values. For example, the apparatus 200 may provide calibration parameters as assistance data to the UE or the NG-RAN node, dependent on whether the positioning is determined using downlink or uplink positioning reference signals. The calibration parameters may include one or more of the following parameters for at least one of the non-terrestrial links:
   The signal delay between the satellite and the gateway on the feeder link.
   The delay between the gateway and the baseband processing unit.
   The processing delay of the satellite.
   The signal attenuation on the links, for example, parameters determining a signal attenuation, like pathloss parameters such as pathloss exponent, correction, look-normal shadowing, applicable channel model and the like.

When the apparatus is provided at the core network, it may signal the calibration parameters or assistance information either to the NG-RAN node or to the UE, or to both, and both may report calibrated measurement values including a signaling that the entities have applied the calibration. The entities, namely the RAN node and the UE, in receiving the assistance data may use the data to adjust the measurement, and the UE may report the measurement back to the apparatus. The report may also include a flag that the UE or NG-RAN node has compensated for the bent-pipe model.

In the case of employing multi-RTT, the estimated RTT for each link without calibration may contain the delay on the service link plus the delay on the feedback link plus additional delays, so that, in accordance with embodiments of the first aspect of the present invention, by estimating the RTT for the feeder link, subtracting it from the overall RTT for the entire link, the RTT on the service link may be obtained and, thereby, the distance between the UE and the satellite.

In accordance with further embodiments, in case the satellite moves during the position determining process, there may also be a change of the feeder link between the satellite and the ground station, while the UE still measures a signal from the satellite. Information about the movement of said satellite is also communicated to the apparatus and taken into consideration when determining the position. Furthermore, the time where the path switch occurred and the location of NTN gateway before and/or after the path switch may be provided as assistance data to the positioning entities.

In accordance with yet other embodiments of the first aspect of the present invention, the estimation of a position of a UE in a network including non-terrestrial components may be based on Doppler values, instead of the measured timing or signal strength values. In accordance with such embodiments, the UE is capable to carry out Doppler measurements and to provide a report about the Doppler measurements to the RAN node. For example, the UE may signal this capability when connecting to a network or in response to a capability request. The UE has the capability to measure the Doppler shift in the carrier frequency used by the satellite for transmitting the bent pipe or transparent payload. Based on the Doppler shift measurements, the pseudorange may be obtained and, thereby, a distance between the UE and the satellite. Using the Doppler values for determining the pseudorange is a well-known approach in the field of satellite technologies, is not described in more detail here.

Figure 8:
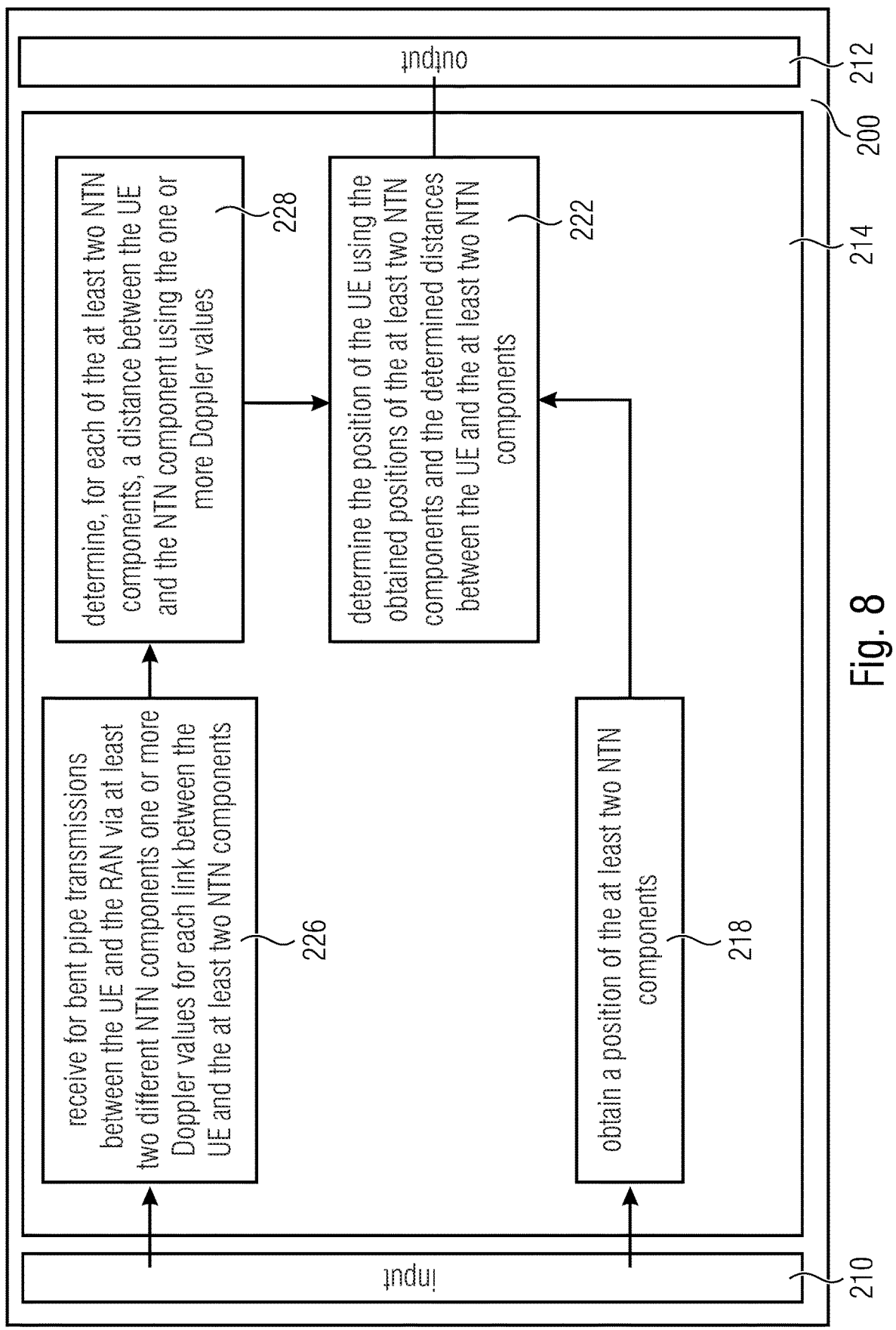
FIG. 8 illustrates a second embodiment of an apparatus in accordance with the first aspect of the present invention employing the Doppler values.

FIG. 8 illustrates a second embodiment of an apparatus in accordance with the first aspect of the present invention employing the Doppler values. The embodiment of FIG. 8 is similar to FIG. 6, except that the apparatus 200 receives 226 the Doppler values. Based on the received Doppler values, the apparatus determines 228 the distance between the UE and the NTN components, so that in the same way as in the first embodiment (see FIG. 6), based on the further information about the position of the NTN components, the position of the UE may be determined 222. The Doppler measurement is carried out in case of the use of downlink positioning reference signals transmitted via the satellite to the UE. In the uplink case, when the UE transmits uplink positioning reference signals via the satellite, the Doppler values are determined at the satellite and forwarded to the apparatus.

In case the apparatus 200 is implemented at the UE, the determined position may be output to the UE which transmits the determined position to the RAN of the wireless communication network.

In accordance with embodiments, the apparatus 200 may send a measurement request to the UE or to the satellite asking to make the Doppler measurements, and the request may include one or more of the following:
the New Radio Absolute Radio Frequency Channel Number, NR-ARFCN, or the carrier-frequency where the measurement is to be made,
a PRS configuration including at least a PRS-ID
a time/frequency location of the PRS signal.

The UE or the satellite may report back the actual measurement, namely the Doppler values and, in accordance with embodiments, in addition the NR-ARFCN or the frequency at which the measurement was made.

Thus, the first aspect of the present invention solves the above problems with the determination of a position of a UE in a wireless communication network including NTN components on the basis of positioning signals of the wireless communication system that are part of the baseband signal which is transmitted as transparent payload via the satellite or NTN component.

Second Aspect

In accordance with a second aspect of the present invention, scenarios are addressed, in which a user device is to access a wireless communication network including NTN components. Because it may be necessary to have knowledge about the position of the UE, the UE may send, together with the request for the connection, its positional information. To make sure that the positional information is accurate enough, it may be desired to verify the position so as to make sure that the required measures are taken, when the UE is connected, e.g., connecting the UE to a desired network or that appropriate parameters for a certain location are provided to the UE. In other words, the second aspect of the present invention provides the wireless communication network with alternative means for verifying a UE position, and a network entity, like a or position computing entity residing at the NG-RAN node or at the NTN gateway may compute a network side position of the UE and verify, on the basis of this NW computed position, a UE reported position.

Figure 9:
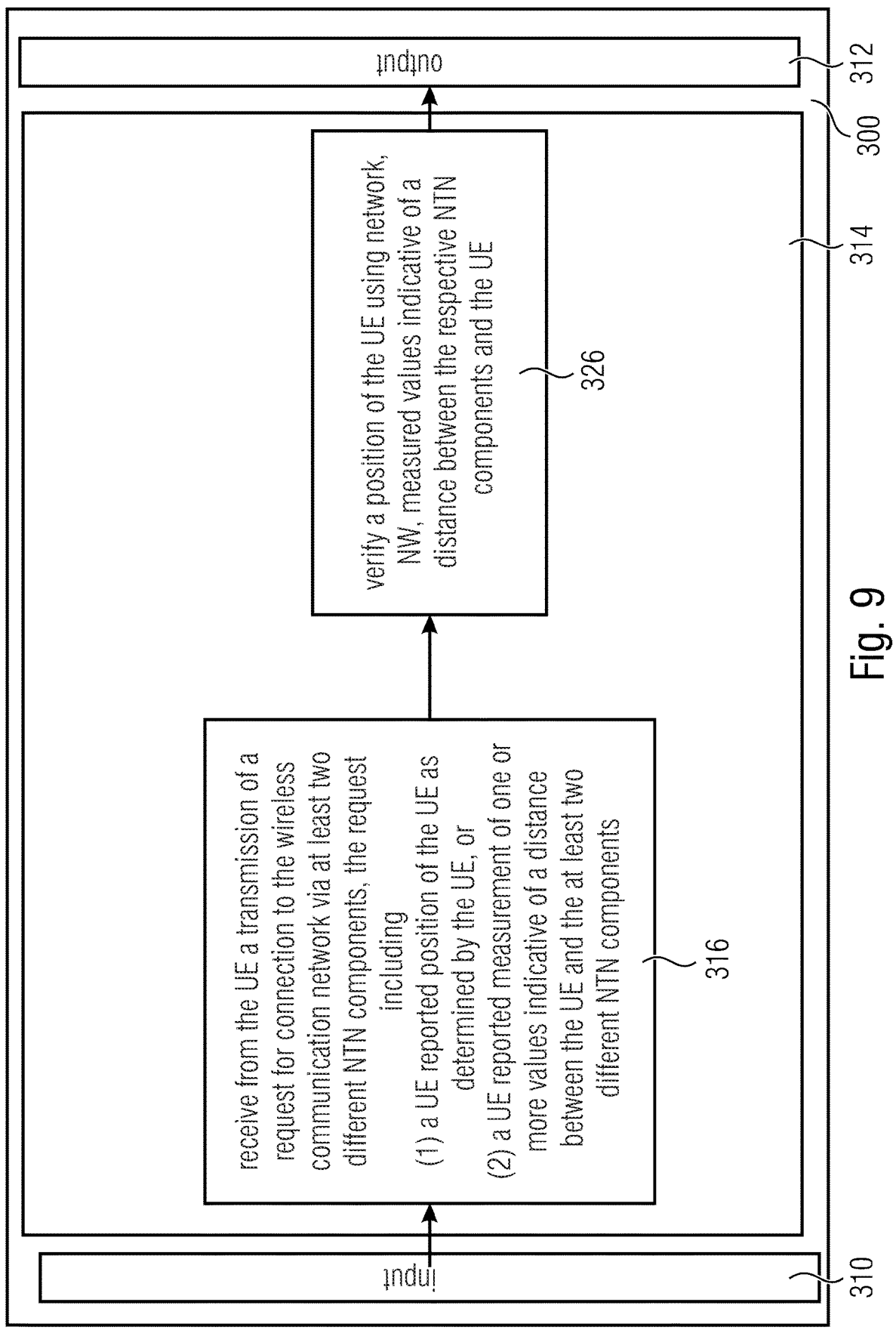
FIG. 9 illustrates an apparatus for determining a position of a user device in accordance with embodiments of a second aspect of the present invention.

FIG. 9 illustrates an apparatus for verifying a position of user device, UE, in accordance with embodiments of the second aspect of the present invention. The apparatus 300 is provided allowing a verification of a position of user device, UE, in the wireless communication network which includes a RAN and a plurality of NTN components. The apparatus 200 is located in the RAN, for example at a RAN node, like $gNB_1$ in FIG. 3. When considering, for example, the scenario of FIG. 3, it may be assumed that the UE wishes to connect to the wireless communication network including the satellites $156_1$ and $156_2$ as NTN components and the RAN including the base stations $gNB_1$ and $gNB_2$. The apparatus 300 includes an input 310, an output 312 and a signal processor 314. The apparatus may receive 316 from the UE a transmission including a request for connection to the wireless communication network. The transition may be sent via at least two different NTN components, like the two satellites $156_1$ and $156_2$ in FIG. 3 and includes a UE reported position of the UE as determined by the UE, or a UE reported measurement of one or more values indicative of a distance between the UE and the at least two different NTN components, and verifies 326 a position of the UE using network, NW, measured values indicative of a distance between the respective NTN components and the UE.

Figure 10:
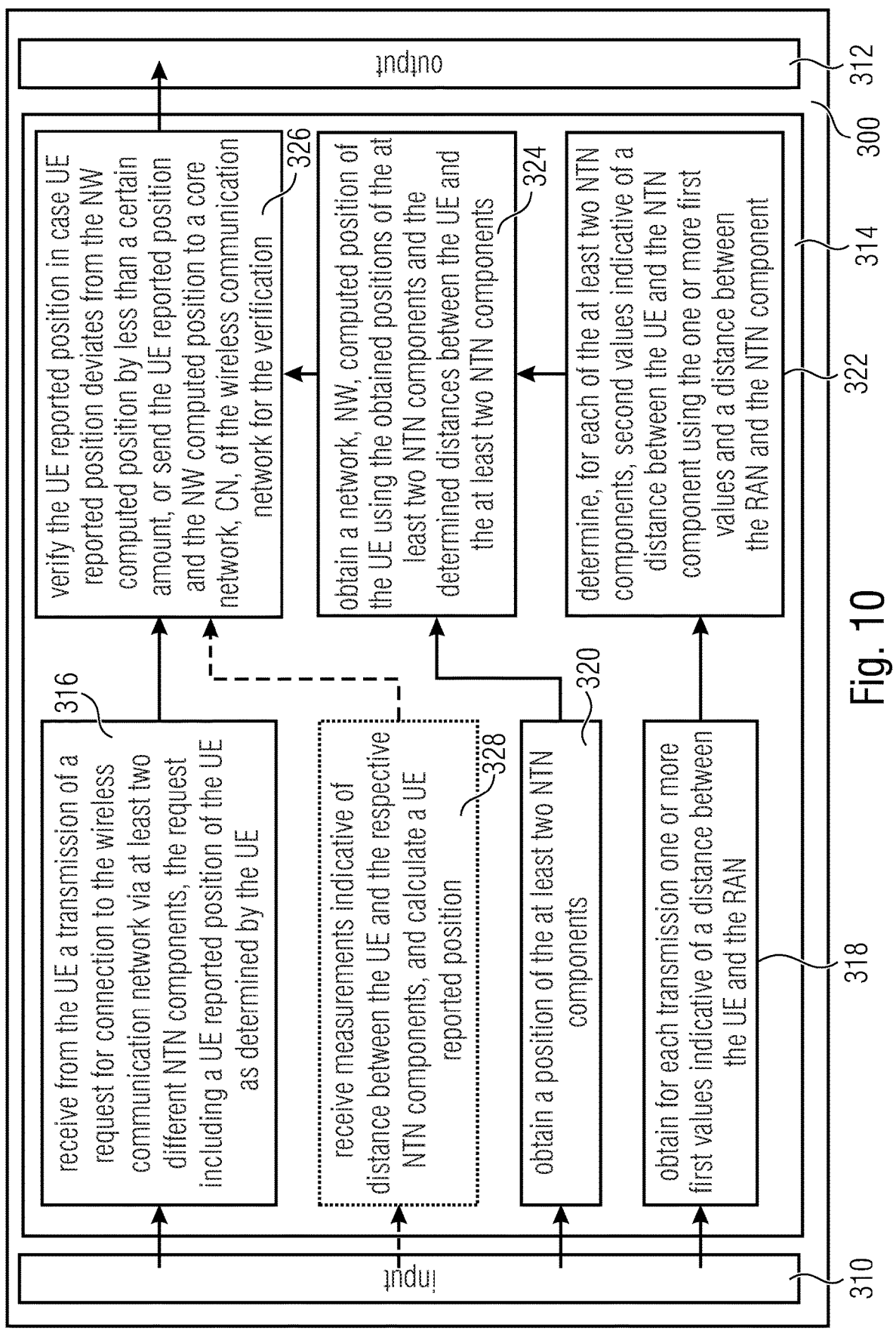
FIG. 10 illustrates a first embodiment of an apparatus for verifying a position of a user device in accordance with a second aspect of the present invention.

FIG. 10 illustrates a first embodiment of the apparatus 300 for verifying a position of user device, UE. The to apparatus may receive 316 from the UE a transmission including a request for connection to the wireless communication network. The transition may be sent via at least two different NTN components, like the two satellites $156_1$ and $156_2$ in FIG. 3 and includes a position determined by the UE, also referred to as the UE reported position. Further, the apparatus 300 obtains 318 for each of the transmission including the request one or more first values indicative of a distance between the UE and the RAN. For example, the apparatus may request the RAN nodes to measure a propagation delay or a signal attenuation of predefined signals included in the request so as to obtain a measure indicative of a distance between the RAN and the UE requesting access. The measurement values and the request may be received at the apparatus 300 via its input 302 and forwarded to the signal processor 314 for further processing in accordance with the inventive approach. The apparatus 300, further, obtains 320 the positions of the satellites, either from an external source, like the O&M mechanism of the network or from the satellite operator via the input 302. In accordance with other embodiments, the positions may be obtained from a storage of the apparatus 300. Based on the measured values indicative of the distance between the UE and the RAN, and based on the information of a distance of the RAN to the respective NTN components, the actual distance between the UE and the respective NTN components is determined 322. The determination 322 may be made in a way as described above with reference to the first aspect of the present invention, namely by determining, for example on the basis of the known positions of the satellites and the gNBs a delay or attenuation on the feeder link between the RAN and the respective satellites, which is subtracted from the overall delay or attenuation measured, thereby obtaining the delay or attenuation on the respective service links on the basis of which the distance is determined. Using the distance between the UE and the satellites and the positions of the satellites, a network computed position of the UE is obtained 324. The UE reported position and the NW computed position are either output via the output 312 for further processing, for example, by the core network so as to allow verifying the UE reported position, or the UE reported position is verified 326 on the basis of the NW computed position and the result of the verification is output, for example, to the core network, via the output 312. It is noted that, as also mentioned above, instead of ToA measurements also TDoA measurements for obtaining Reference Signal Time Differences, RSTDs, may be used For example, one use case of cross checking the position computed at the UE may be to assist in the PLMN selection because it is possible that a satellite beam spans more than one country or region and/or that the span of the satellite beam changes, so that fulfilling certain regulatory aspects, such as the PLMN selection or frequency allocation, may need to be adjusted dependent on the actual location of the UE. In such a use case, the connection to the positioning entity, like the apparatus 300, has not yet been established so that the NG-RAN node or the NTN gateway itself compute the position of the UE before actually establishing the connection for the UE, like the N2 connection. Another use case implementing the second aspect of the present invention is the verification of a UE position during an emergency situation, for example, in an emergency call scenario, while the UE mobile itself is not yet registered in a PLMN.

The UE may report its position of the network by requesting NR-connectivity via the satellites, and the network computes in the above-described way the UE position again based on the measurements available at the network. The UE reported position and the NW computed position are compared against each other so as to verify the UE reported position.

In the embodiment described above, the verification was based on the actual position transmitted by the UE together with the request, however, in accordance with other embodiments, rather than sending the actual position as determined by the UE, the UE may report to the apparatus 300 the measurements of the UE on the basis of which the apparatus determines a UE reported position, e.g., measurement indicative of the distance between the UE and the respective satellites. The apparatus 300, see FIG. 10, rather than receiving 316 together with the connection request the UE position, receives 328 together with the connection request the measurement. In accordance with embodiments, using the measurements at the UE indicative of the distance between the UE and the respective NTN components, and using the satellite positions, a UE reported position may be calculated 328 at the network side, which is then verified 326 against the NW computed position as described above. The measurements at the UE indicative of the distance between the UE and the respective NTN components may include timing values, signal strength values or Doppler values.

In accordance with other embodiments, rather than calculating the NW computed and UE reported positions at the network side, the measurements indicative of the distance between the UE and the NTN components as reported by the UE and as determined by the apparatus 300 may be used for verifying the UE position.

Figure 11:
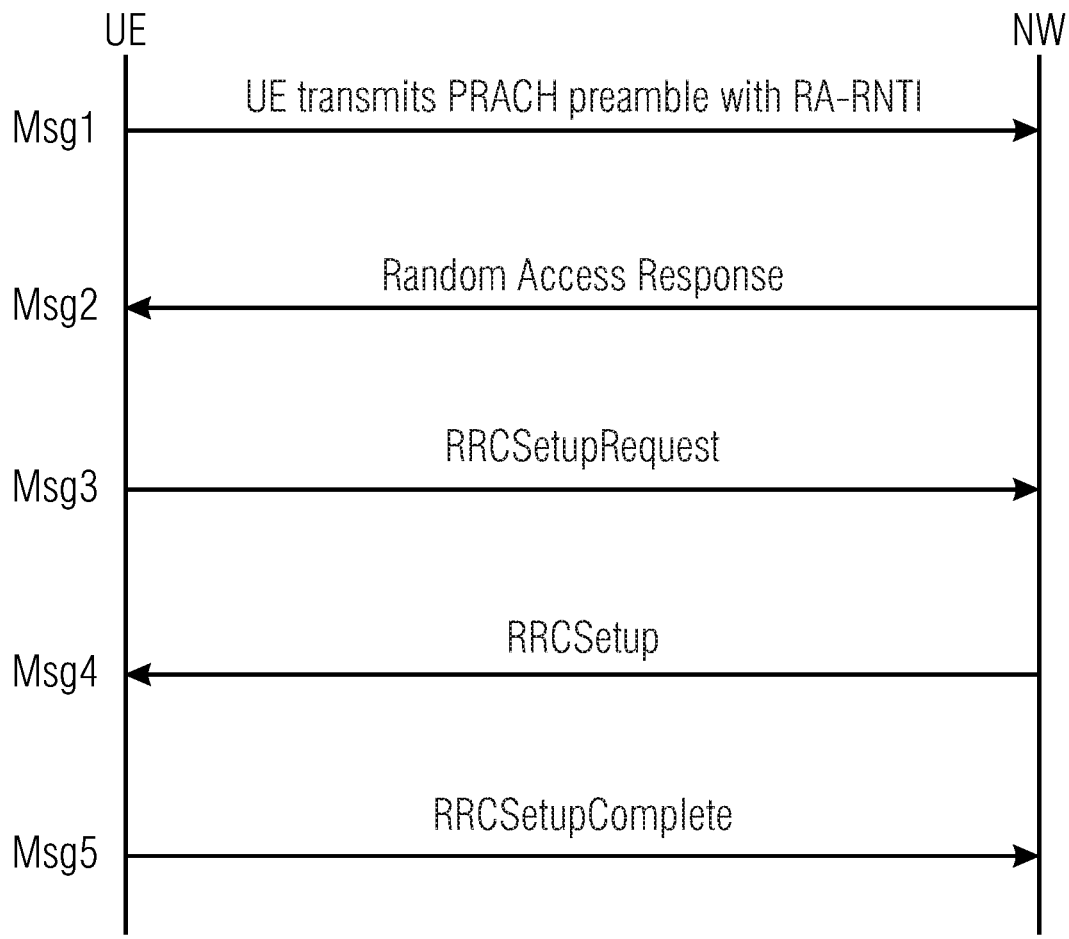
FIG. 11 depicts the exchange of signaling between the UE while the UE registers itself with the network.

A further embodiment of the second aspect is now described in accordance with which for the verification at the NG-RAN node side, the UE location is expected to be computed while the UE is not yet registered with the CN. FIG. 11 depicts the exchange of signaling between the UE while the UE registers itself with the network. In particular, with the RRCSetupRequest message the UE requests to enter the RRC_CONNECTED state with the network and upon receiving the RRCSetup message the UE enters the RRC_CONNECTED state. The next task is registering the UE with the core network (CN) and this is triggered by transferring the dedicated NAS message from the UE to the AMF located in the CN. This dedicated NAS message is contained within the RRC message RRCSetupComplete (also known as "Msg5").

The RRCSetupComplete message includes the dedicated NAS message sent to the AMF from the UE and looks as depicted in FIG. 12.

After receiving the RRCSetupComplete message, the NG-RAN node selects an AMF, selects the RAN UE NGAP ID and then sends the initial UE Message. The initial UE message is sent by the NG-RAN node to transfer the initial layer 3 message to the AMF over the NG interface and is defined as follows:

| IE/Group Name | Presence | Range | IE type and reference (TS 38.413) | Semantics description | Criticality | Assigned Criticality |
| --- | --- | --- | --- | --- | --- | --- |
| Message Type | M | | 9.3.1.1 | | YES | ignore |
| RAN UE NGAP ID | M | | 9.3.3.2 | | YES | reject |
| NAS-PDU | M | | 9.3.3.4 | | YES | reject |
| User Location Information | M | | 9.3.1.16 | | YES | reject |
| RRC Establishment Cause | M | | 9.3.1.111 | | YES | ignore |
| 5G-S-TMSI | O | | 9.3.3.20 | | YES | reject |
| AMF Set ID | O | | 9.3.3.12 | | YES | ignore |
| UE Context Request | O | | ENUMERATED (requested, . . .) | | YES | ignore |

-continued

| IE/Group Name | Presence | Range | IE type and reference (TS 38.413) | Semantics description | Criticality | Assigned Criticality |
|---|---|---|---|---|---|---|
| Allowed NSSAI | O | | 9.3.1.31 | | YES | reject |
| Source to Target AMF Information Reroute | O | | 9.3.3.27 | | YES | ignore |
| Selected PLMN Identity | O | | PLMN Identity 9.3.3.5 | Indicates the selected PLMN id for the non-3GPP access. | YES | ignore |
| IAB Node Indication | O | | ENUMERATED (true, . . .) | Indication of an IAB node | YES | reject |
| CE-mode-B Support Indicator | O | | 9.3.1.156 | | YES | reject |
| LTE-M Indication | O | | 9.3.1.157 | | YES | ignore |
| EDT Session | O | | ENUMERATED (true, . . .) | | YES | ignore |
| Authenticated Indication | O | | ENUMERATED (true, . . .) | Indicates the FN-RG has been authenticated by the access network. | YES | ignore |
| NPN Access Information | O | | 9.3.3.46 | | YES | reject |

Of particular interest is the field UserlocationInformation, which describes the location of the UE required from the CN perspective. The relevant part is the NR user location information which tells what information about the UE is transmitted to the network during registration

| IE/Group Name | Presence | Range | IE type and reference (TS 38.413) | Semantics description | Criticality | Assigned Criticality |
|---|---|---|---|---|---|---|
| CHOICE User Location Information | M | | | | — | |
| >E-UTRA user location information | | | | | | |
| >>E-UTRA CGI | M | | 9.3.1.9 | | — | |
| >>TAI | M | | 9.3.3.11 | | — | |
| >>Age of Location | O | | Time Stamp 9.3.1.75 | Indicates the UTC time when the location information was generated. | — | |
| >>PSCell Information | O | | NG-RAN CGI 9.3.1.73 | | YES | ignore |
| >NR user location information | | | | | | |
| >>NR CGI | M | | 9.3.1.7 | | — | |
| >>TAI | M | | 9.3.3.11 | | — | |
| >>Age of Location | O | | Time Stamp 9.3.1.75 | Indicates the UTC time when the location information was generated. | — | |

| IE/Group Name | Presence | Range | IE type and reference (TS 38.413) | Semantics description | Criticality | Assigned Criticality |
|---|---|---|---|---|---|---|
| >>PSCell Information | O | | NG-RAN CGI 9.3.1.73 | | YES | ignore |
| >>NID | O | | 9.3.3.42 | | YES | reject |
| >N3IWF user location information | | | | | | |
| >>IP Address | M | | Transport Layer Address 9.3.2.4 | UE's local IP address used to reach the N3IWF | — | |
| >>Port Number | O | | OCTET STRING (SIZE(2)) | UDP or TCP source port number if NAT is detected. | — | |
| >TNGF user location information | | | | | YES | ignore |
| >>TNAP ID | M | | OCTET STRING | TNAP Identifier used to identify the TNAP. Details in TS 29.571 [35]. | — | |
| >>IP Address | M | | Transport Layer Address 9.3.2.4 | UE's local IP address used to reach the TNGF. | — | |
| >>Port Number | O | | OCTET STRING (SIZE(2)) | UDP or TCP source port number if NAT is detected. | — | |
| >TWIF user location information | | | | | YES | ignore |
| >>TWAP ID | M | | OCTET STRING | TWAP Identifier used to identify the TWAP. Details in TS 29.571 [35]. | — | |
| >>IP Address | M | | Transport Layer Address 9.3.2.4 | Non-5G-Capable over WLAN device's local IP address used to reach the TWIF. | — | |
| >>Port Number | O | | OCTET STRING (SIZE(2)) | UDP or TCP source port number if NAT is detected. | — | |
| >W-AGF user location information | | | | Indicates the location information via wireline access as specified in TS 23.316 [34]. | YES | ignore |
| >>W-AGF user location information | M | | 9.3.1.164 | | — | |

From the signaling between NG-RAN and AMF, the CN knows the location of the UE only within a cell inside a tracking area identifier, TAI.

Noting that with the coverage region with a NTN cell span multiple country borders, therefore using the UE position only within TAI or NG CGI (Cell Global Identifier) may lead the UE to attempt to connect to the PLMN not corresponding to the PLMN operating in the country where the UE is physically located.

This may be solved by the following steps;

1) The UE reports the UE location to the RAN network, where the UE has computed its position using A-GNSS, GNSS or other UE-based methods. The location report may contain at least one of the following—timestamp, estimate of position in any one of the coordinate systems (local, ECEF, . . . , etc.), estimated velocity, error in estimate, source of measurement used for computing position. The reported UE location may also be a logical location information, such as an NTN cell, a logical part of the NTN cell, a mapped cell, whereby within an NTN cell there are smaller zones, or an alternate representation of the UE location, done intentionally to conceal the true UE location. The reported location may be a location reported using latitude, longitude and optionally altitude and/or velocity. This information may be sent to the NTN NG-RAN network or to the AMF. This information may be sent out encrypted using the encryption keys available from the system when security mode is activated. Furthermore, if the UE needs to send out the information before the security mode is activated, there may be one or more default keys, which may be optionally stored in the UE (e.g. in the user subscriber identity module (USIM, eSIM, etc.) or elsewhere within the UE), which may be used by the UE to encrypt its location before the AS and/or NAS encryption is enabled by the 5G system. The default encryption may be based on default keys. Optionally, there may be more than one set of default keys stored in the UE, out of which one set of default key is selected. The selection may be made based on a timestamp. The timestamp may be GNSS time or UTC time, and certain number of LSBs from the time may be dropped while deriving the timestamp to be used to select the keys. The set of default keys and/or algorithm to select the default keys, may optionally, be updated by the 5G system while the UE is registered in the network.

Alternatively, the network may deduce coarse location information based on parameters selected by the UE. The parameters selected by the UE may include the selectedPLMNIdentity as a part of RRCSetupCompleteIEs contained within the RRCSetupComplete message. The UE may determine its location using one of the positioning methods available (such as A-GNSS). This information may further be used by the UE to either implicitly and/or explicitly signal its location information to the network. The implicit location information provided by the UE may include the selectedPLMNIdentity and/or a mapped cell ID and/or an identifier which indicates a part of the coverage region within an NTN cell.

The selectedPLMNIdentity and/or the mapped cell may be based on at least one of the following:
1. Selection of a mapped cell and/or PLMN and/or Tracking Area Code, TAC, based on a closest reference point:

The UE is provided assistance data, where the assistance data tells the UE the location of the reference point, and the reference point is mapped to at least one PLMN and/or at least one TAC and/or at least one NR-CGI and/or at least one mapped NR-CGI. One way to indicate the location of the reference point is to indicate the position of the reference point using earth centered earth fixed (ECEF) coordinates.

The network may choose to provide the reference points with varying density along the coverage region. One way of doing so may be to specify the starting and the end points of a rectangular region and the displacement between the grids, to obtain the reference points and a linear mapping between the reference points. The rectangular regions may be cascaded (may be overlapping or non-overlapping) to cover part or all of the satellite footprint.

An embodiment of the selection of a mapped cell and/or PLMN and/or Tracking Area Code, TAC, based on a closest reference point is now described in more detail with reference to FIG. 13(a) and FIG. 13(b).

Figure 13A:
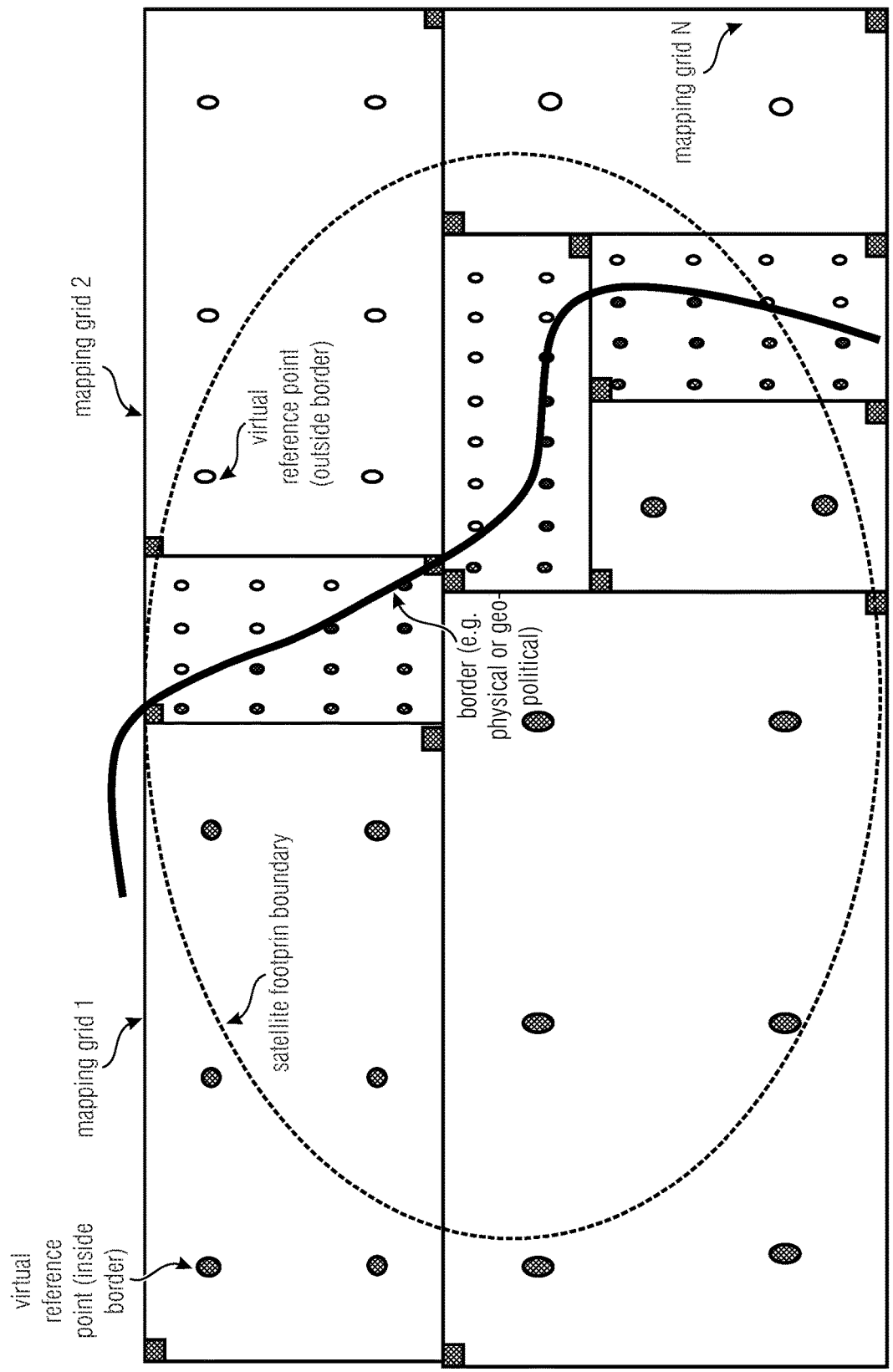
FIG. 13(a) illustrates the use of assistance data for the UE to determine TAC and PLMN.
Figure 13B:
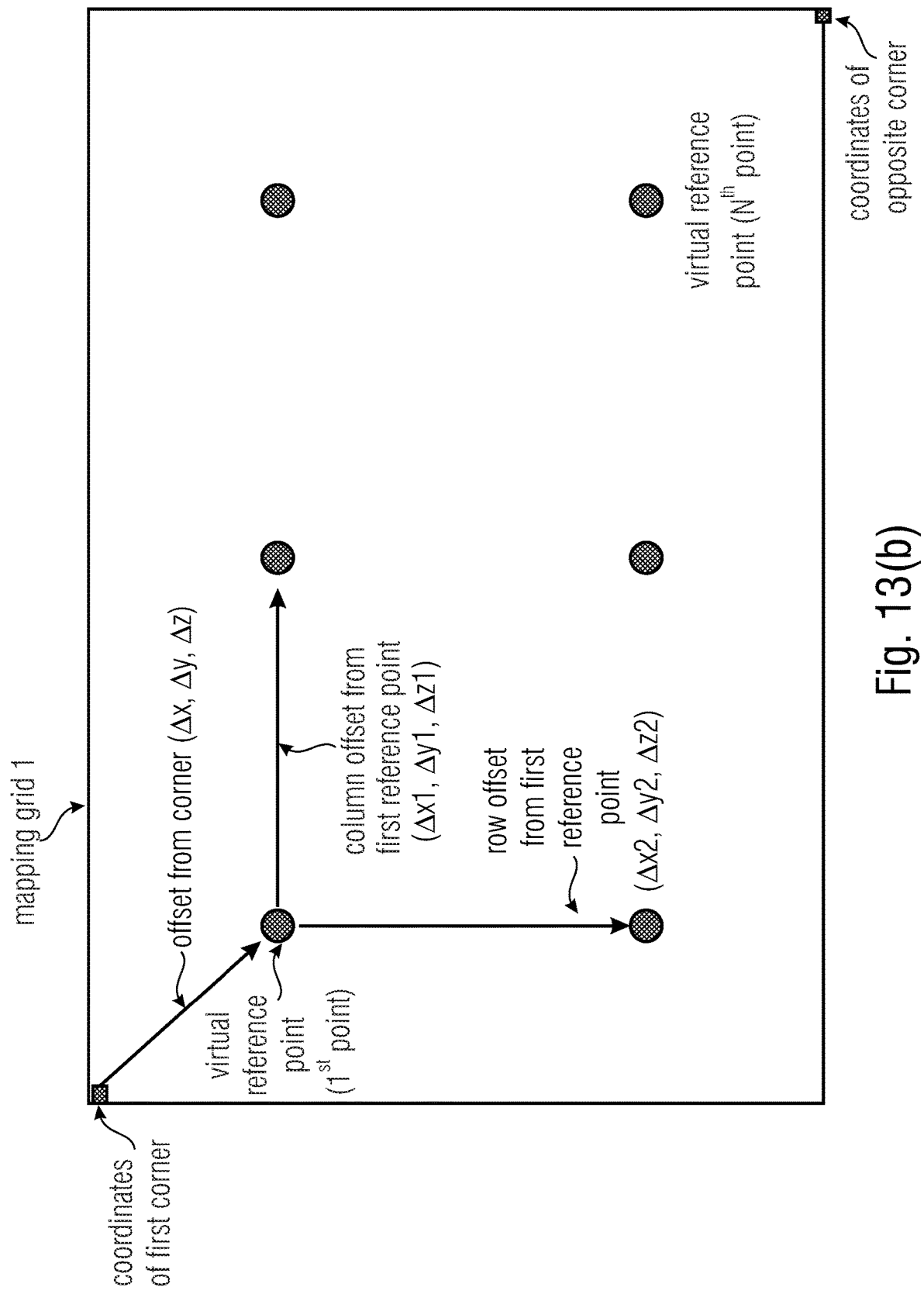
FIG. 13(b) illustrates an example for the construction of a mapping grid in FIG. 13(a)

FIG. 13(a) illustrates the use of assistance data for the UE to determine TAC and PLMN, and FIG. 13(b) illustrates an example for the construction of a mapping grid in FIG. 13(a). In the depicted embodiment, the country border is shown and the reference points inside the country are shown as filled circles and outside the country are shown as empty circles. To enable tracking of PLMN and TAC better, the mapping grids are smaller and denser closer to the country border and larger and sparser away from the border.

The footprint of the NTN satellite is tiled with one or more planes (mapping Grid in FIG. 13(a)). Each of the mapping grids comprises of grid points where each point corresponds to a virtual location on a coordinate system (such as earth centered earth fixed). Each point has attributes, such as PLMN ID, TAC, and so forth.

The UE determines its position using one of the positioning methods available (e.g. UE-based A-GNSS). Then it determines in which of the mapping grids does the UE lie. Then it finds the point within the mapping grid and determines the applicable parameter corresponding to this grid. The UE then uses this information for initiating further procedures with the network.

The derived TAC may be used to perform TAC update if the TAC in the new grid changes from the original one. The derived registration area may be used for a registration area update if the registration area changes. The derived PLMN associated with the grid point may be used to select the PLMN (selectedPLMNIdentifier) within the RRCSetupComplete message.

The NTN network may broadcast a list of one or more grid planes (Mapping Grids), each of which contains grid points (virtual reference points). The grid plane may be expressed as rectangles, then the grid planes are indicated to the UE by indicating the coordinates of diagonally opposite points (for example: upper left and lower right, or lower left and upper right). An example of a mapping grid is shown in FIG. 13(b).

The location of the first grid point with respect to one of the corners is provided optionally. If this is not present, then the first reference point is assumed to be on the top corner (or equivalently one of the corners) or half of the displacement between the first grid point and the second grid point for uniform placing of grid points within the grid. The location of remaining points may be generated using the difference to the first grid point. The displacement between two points in this plane may be indicated row-wise and column-wise or the second displacement may be derived based on the first displacement. Furthermore, the different mapping grids may have a different density of grid points, in order to enable quick search of an applicable grid point.

Each of the grid points (virtual reference points) may be associated with at least one information. The information may be PLMN, TAC, a virtual NG-RAN cell ID and other information that may be location dependent. Each grid point within the mapping grid may be associated to an index. The index of each of the point may be increasing from top left to bottom right in a row first or a column first manner.

Within the mapping grid, the information for each of the grid points (virtual reference points) may be the same or it may be possible to derive information based on the information associated with the first virtual reference point and the differential information and index of the virtual reference point. Alternatively, there may be some attributes which may be different within the grid. These information need to be provided individually. As an example: each of the points in Mapping Grid 1 may have the same applicable PLMN list (PLMN 1 and PLMN 2) and same applicable TAC, whereas in Mapping Grid 2, some of the grid points may use first TAC ID (filled points) and some of the grid point may use second TAC ID (unfilled points). As for derived information, the information may be the mapped cell ID and there may be an increasing order from the top left to the bottom left, where the mapped cell ID increases by a fixed value as one moves along. The parameters that are common to the grid may be indicated as attributes of the 'mapping grid', and the parameters that change within the grid may be indicated as attribute of the grid points. For example, if the UE is within the Mapping Grid 1, and since the Mapping Grid is inside country 1, it has the same TAC and PLMN. This may be signaled as an IE at the grid level. However, 'Mapping Grid 2' lies partially in country 1 and partially in country 2. In this case, the parameters are defined/generated as applicable for a grid point. Alternatively, the parameter may be defined for the 'mapping grid' and may be applicable to all grid points unless it is overwritten for a particular grid point. For example, the 'Mapping Grid 2' may have a parameter PLMN defined at the 'Mapping Grid' level and may be applicable for all points where no information is provided additionally in the grid point level. Where the information is provided separately at the grid point level, the information provided at the 'mapping grid' level is overridden by the information provided at grid level. This is applicable, for reducing signaling overhead, for example, if in a grid, a large number of points have TAC as TAC1 and a small number has TAC as TAC2, then it causes less overhead if the mapping grid has TAC1 as value of TAC, and only those points that have TAC as TAC2, signal this value at the grid point level. The grid may also be used by two operators (or virtual operators) in the same country, where they may share the TAC but not the PLMN and/or one or more operators outside the country, where both TAC and PLMN code differ with respect to the first country.

The UE performs one or more of the following:
1) The UE determines its location based on one of the positioning methods available or receive its location from the LMF.
2) The UE determines the applicable mapping grid corresponding to its location from the list of mapping grids provided. A UE may have been provided simply one mapping grid.
3) From the mapping grid, the UE determines the applicable grid point (virtual reference point) and determines or obtains the information corresponding to this point. As an example, the UE may determine the PLMN allowed to operate at the location corresponding to this grid. As a second example, the UE may determine (and optionally report) the TAC—tracking area code (or tracking area identifier—TAI) corresponding to this reference point.
4) The UE uses these procedures to initiate the UE procedures based on the information. As an example: the UE may perform a TAC update if it determines that the closest grid has a different TAC information. The UE may select a certain PLMN to initiate the UE Registration. The UE may report the identifiers of the grid point, in order for the network to prepare handover, or provide handover assistance data. Additionally, the identifiers may also be used optionally as a guideline to determine which of the public safety answering point terminals may be selected.
5) Optionally, the UE may indicate its location or the identifier for the grid point, when initiating connection or when performing TAC update or initiating any other signaling procedures to the network, so that the location reported by the UE may be verified by the network. This may be needed, for example, for regulatory services such as emergency calls, applying country specific rules, . . . etc.

The network entity performs one or more of the following:
1. Prepare the grid points, their spacing, parameters and group the grid points into different mapping based on the information to be transmitted and the physical density of grid points within the mapping grid.
2. Signal the information to the UE, enabling the UE to determine the grid point (virtual reference point) close to the UE, the information consisting of the List of grid planes (mapping grid), each of the grid characterized by:
   a. A rectangular region described by coordinates of two opposite corners of the rectangle defining the mapping grid. The location may be in any coordinate system. However, earth centered earth fixed (ECEF), coordinate system is advantageous, among others to keep boundaries of TAC and PLMN fixed in a coordinate system, even when the cells move.
   b. Information to determine the grid points and their location, such as a displacement vector, that indicates the displacement of one grid point with respect to the initial grid point.
   c. Information common to the grid.
   d. Information for each grid point, or information for first grid point and the supplementary information so that the information for each grid point may be generated based on the first grid point.
   The assistance data may be provided either in broadcast mode (e.g., in a system information message) or via unicast. The assistance information provided to the UE may be operator specific. In which case, the reference point may be generated by a particular PLMN operator and signaled to the UE via unicast. The location provided by the UE may be also be applicable for network operation (handover management, TAC, paging purposes and so forth.) by the PLMN operator. The reporting of location information, to the operator, may also be done optionally as non-signaling data transmission (i.e., using dedicated radio bearers instead of or in addition to signaling radio bearers).
2. Selection of a mapped cell and/or PLMN based on configuration data containing information about the country borders:
   The mapping of UE determined location to the mapped cell and/or PLMN and/or TAC code and/or TAI and/or an identifier may be done based on information on country borders either transmitted by the network and/or stored at the UE during initialization (e.g. by data stored into the UE before deployment). This data may also be provided as part of software update.
3. Selection based on previously selected terrestrial network component:
   In case of dual connectivity between NTN and terrestrial network, the UE may determine the PLMN to select for NTN access based on a terrestrial RAN network. Alternatively, in case of mobility between terrestrial network, TN, and NTN, the selected logical information may be based on the parameters derived from the TN where the UE was last connected. For example, the selectedPLMNIdentity used during connection to TN may indicate the country where the UE is located, and the UE may be able to use this information to attempt to connect to a suitable PLMN during NTN access.

A possible means of reporting the UE position to the network is illustrated in FIG. 14. Alternatively, the UE selects the parameters in one of the UE messages to the network, where at least one UE parameter is a location dependent parameter (such as PLMN, tracking area code (TAC), tracking area identifier (TAI), system information area identifier, identifier of the grid point). Such information may optionally be carried as an IE, e.g., an IE of one of the following messages in the RRC protocol or the LPP protocol-RRCSetupComplete, CommonLocationInfo in RRC and/or within LPP, ProvideLocationInformation (LPP protocol), or within a NAS message, like one of the NAS messages (Service Request, Registration Request, Registration Complete, Service Request, Authentication Request, Identify Request.).

2) The NG-RAN node may use this UE location to determine the tracking area indicator (TAI) that corresponds to the location of the UE. The tracking area indicator consists of PLMN and tracking area code. The NG-RAN may select the AMF based on the UE location or the parameters selected by the UE itself (e.g., selectedPLMNIdentity) based on the UE location. One particular example, is to use the grid point information reported by the UE as its closest grid point and/or the UE location reported by the UE, to generate the TAI. The mapping of grid points to the TAI may be available as part of provisioning at the NG-RAN node. So, the TAI may be deduced based on the grid point (or information based on the grid point) reported by the UE. The NG-RAN node may send the registration request to the AMF selected corresponding to the UE location determined.
   a. The NG-RAN node may cross check the UE reported location for correctness using any of the following measurements-RSTD, ToA, received RSRP, timing advance, TA, for the given satellite position, the reported UE position and the location of the ground station (NTN gateway). Alternatively, the NG-RAN node may compute the position independently and compare against the position computed by the UE.
      i. The NG-RAN node may provide numerical value describing the quality of the cross-checking mechanism. The quality values may be a numerical value within the scale [minVal, maxVal], where minVal is the lowest confidence in the verified results and maxVal is the maximum confidence in the values, or they may be confidence intervals, rms Error rate, probability or any other statistical metrics describing the quality of cross check. It may also report the method or the measurements used for cross-verifying the position used.
      ii. The NG-RAN node may provide the NG-RAN node computed position and/or the UE reported position to the AMF. It may optionally also report the method used for computing the position at the NG-RAN node.
   b. Alternatively, the NG-RAN node may simply forward the UE reported position (or the logical information dependent on UE position) to the network
3) The AMF may proceed with processing the "REGISTRATION REQUEST" and respond either with "REGISTRATION ACCEPT" or "REGISTRATION REJECT"
   a. The AMF initiates one of the LMF-based positioning methods to determine and/or cross-check the UE location, or it may utilize the UE position determined using A-GNSS in UE-based mode to determine whether or not the UE is allowed to access the PLMN.

b. If the AMF determines that the UE is located in the country where the PLMN is not allowed to operate, then it signals "REGISTRATION REJECT" to the UE.
  i. It may provide further assistance data to the UE on selecting the suitable PLMN corresponding to the location of the UE.
c. If the AMF determines that the UE is located in the country where the PLMN is allowed to operate, then it signals "REGISTRATION ACCEPT" to the UE.

According to an embodiment, the UE may be barred from using at least one service provided by the 5G System, 5GS, until the position of the UE has been determined and/or verified by the LMF. In line with this embodiment, the position determined and/or verified by the LMF may be used by the AMF to determine whether to reject the registration of the UE and/or to enable the UE to access the at least one service from the 5GS restricted to the UE before the location was verified. The position verification step may be triggered anytime by the AMF and the REGISTRATION REJECT either followed with or together with assistance data to help the UE to initiate registration with the correct PLMN.

According to an embodiment, if the UE attempting to connect to PLMN via NTN selects the PLMN in a country different from the home PLMN (i.e. the PLMN) indicated in the user subscription (e.g. USIM (user subscriber identity module)) in the UE and the registration is rejected by the said PLMN, then the UE attempts to attach to the home PLMN if the home PLMN is part of the PLMN broadcasted by the NTN cell. In line with this embodiment, the UE may indicate the home PLMN that the UE is attempting to attach to the home PLMN after the registration attempt in the PLMN corresponding to the UE is rejected by the visited PLMN.

The following measurements may be obtained at the NG-RAN node and the measured values may be compared against the expected values to determine the validity of the position.

1) UL-RSTD Measurements
   The RSTD measurement of a UL reference signal (e.g. UL SRS) measured between two satellites which may be served by a single NTN gateway or two different NTN gateways. In case of two different NTN gateways, the measurements need to be exchanged over the XN interface, given that the two gateways connect to two different gNBs.
2) Multi-RTT Measurements
   The UE may report the time difference between the time it received the DL signal and the time it sent out the UL signal. (UE Measurement)
   The NG-RAN node reports the time difference between the time it received the UL signal and the time it sent out the DL signal. (NG-RAN measurement)
   The difference between the NG-RAN measurement and the UE measurement gives the round-trip time.
   Since the satellite position is constantly changing, the multi-RTT instants at different time and the knowledge of satellite orbital parameters may be used additionally to determine whether the change in multi-RTT instants are consistent with the position reported by the UE.
3) DL-RSTD Measurements
   The RSTD measurement of DL reference signal (e.g. DL PRS) transmitted by two different satellites measured by the UE and reported to the NG-RAN node may be used for verification.
4) TA Measurements
   The TA measurements may be used to determine the region within the satellite cell and this region may be mapped to TAI, thereby allowing the NG-RAN node to determine the correct TAI for the UE. Likewise, the TA measurements may also be input to the E-CID measurements.
   In accordance with these embodiments, the TA which may be obtained by the NG-RAN node may consist of a common part and a UE-specific part. The common part may be determined and/or signaled by the network side to the UE and/or the UE determines its TA independently and may report the TA applied by the UE to the network.
   The common part of the TA is defined to take the TA from the satellite to a reference point (RP) into account, and the UE specific part of the TA covers the TA from the UE to the satellite. The reference point may be chosen to be at the satellite (resulting in TA_common=0). This, in effect, compensates the delay due to feeder link. Alternatively, such reference point may be located at some point located at the feeder link (TA_common>0), or it may be chosen to be at the gateway or a gNB (resulting in TA_common that captures the entire feeder link and the service-link TA). In essence, the RP is defined as a point with respect to which DL/UL frames are aligned. This RP may be at the base station for terrestrial scenarios. For the NTN network, the location of the RP may be under control of the network.
   Alternatively, the reference point may be a location on the ground. In this variant, the TA used by a device and/or a virtual device and/or a virtual network element may be used as a reference. The TA used by the UE may be compared to the TA used by at least one NW element (or may have been used by a network element if it were placed there), to deduce which of the reference point is closest to the UE.
5) RSRP Measurements
   The RSRP measurements determined on the uplink signal or measurements for cell-selection provided by the UE may be used to cross-check whether the RSRP measurements tally with the corresponding position.
6) ToF Measurements
   The difference between the time the signal has left the satellite to the time it has reached the UE antenna (DL) or vice versa (for UL)
7) Doppler Measurements
   The Doppler measurement reported by the UE or by the NG-RAN node may be used to cross check the UE position.

For cross-checking, the expected value and the measurement may be compared against each other. If the difference is less than a threshold value or within a range, then the UE position may be considered to be verified.

The UE position and/or measurement information may be attached to the NAS or NG Application Protocol, NGAP, messages, like the REGISTRATION REQUEST or the CONTROL PLANE SERVICE REQUEST.

In accordance with other embodiments, the wireless communication network may ask for this information separately, i.e., responsive to a request for a connection, the network may request the UE to also transmit a UE reported position or an associated measurement value obtained at the UE.

In accordance with further embodiments of the second aspect of the present invention, the NG-RAN network may signal one or more of the following to the core network, CN, responsive to receiving a request for connecting to a PLMN and the verification of the UE location or position:

A flag, having for example the values 0 or 1, may be output so as to indicate whether the UE reported location or position may be trusted (flag=1) by the entities in the core network or not (flag=0).

A flag, having for example the values 0 or 1, may be output which only indicates that the UE reported location or position was verified or cross-checked by the NG-RAN node (flag=1) or not (flag=0).

The apparatus 300 may determine parameters describing a deviation of the UE reported position or the UE reported measurement with regard to the NW computed position. The parameters may include a value within a certain interval, like numbers ranging from 0 to 10 so that the values in the interval map to certain error characteristic, e.g., lower values indicate a higher deviation while lower valued indicate a lower deviation between the UE reported and the NW computed positions, or be a confidence interval, or be a quality parameter or a statistical measure relating the UE reported values with either network computed values or true measurements.

Parameters describing the reliability of the measurement or the method used to determine the reliability of the position. The method used by the UE and/or NG-RAN node for determining the reliability with its associated numerical values describing the reliability may be signaled to the NG-RAN node and/or to the CN. Examples are: Receiver Autonomous Integrity Monitoring, RAIM, Advanced RAIM, ARAIM, Space Based Augmentation System, SBAS, Ground Based Augmentation System, GBAS. The CN and/or the NG-RAN network may use the reported method and/or the parameters to determine whether or not the UE reported location is trustworthy.

In case the UE is capable of receiving information from the CN, the CN may signal to the UE and/or to the RAN node to use a certain integrity method and report the results. For example, the UE may report that it has capability to execute integrity methods, such as RAIM, ARAIM, SBAS, GBAS, etc. and the NW (either CN or NG-RAN) may ask the receiver to employ such methods and report the results to the CN. For example, in case of RAIM, the UE may compute a position using measurements from a subset of satellites (either GNSS or NTN satellites) and report the positions obtained by various subsets or combine the computed position to form a single position value with a second value describing the quality or confidence in the position computation.

In accordance with embodiments, the CN may signal to the NG-RAN network the parameters used to define the deviation, for example, the CN may configure the NG-RAN to initiate a connection only when the position and/or measurements reported by the UE deviate from the position and/or measurements computed by the network entity, like NG-RAN node, by a certain threshold. In such embodiments, the CN trusts the position reported by the UE once it has been verified by the NG-RAN.

As mentioned above, in accordance with other embodiments, the CN may require the UE and/or the RAN network to signal the location together with the numerical measures on the trust that may be placed on the measurements.

To assist the NG-RAN node in verifying the UE position, the NG-RAN node may receive a assistance data and/or configuration data either from an entity within the core network such as the LMF, AMF, Unified Data Management, UDM, originating from external servers or from the Operation and Maintenance, O&M, mechanism. The assistance data may be one or more of the following:

The configuration of downlink positioning reference signals, which may include one or more of:
parameters describing the reference signal, e.g., a sequence length,
a time-frequency location of the signals,
a transmit power
The location of the satellite, like the ephemeris.
Corrections, e.g., GNSS corrections assistance data.
A Xn connection between gNBs serving different NTN-Gateways.

The gNBs may exchange the measurement for determining a position among one another using the backhaul network, like the Xn protocol. For example, the UE may see four satellites in the sky but only two of them may have a feeder link with the gNB hosting the serving cell for the UE. For the uplink measurements from the other satellite, the gNB hosting the serving cell may provide an UL or DL reference signal configuration to a gNB hosting another satellite in the view of the UE and ask the satellite to make measurement and report back the measurements. The NG-RAN node may then use the measurements from the satellite served by itself and also from the satellite served by another NG-RAN gateway to compute the position. In case of the report requested by the LMF, the LMF may interact directly with the gNB feeding the respective satellites and request measurements.

In accordance with yet other embodiments of the second aspect of the present invention, the NW computed UE position may be computed based on Doppler values, instead of the measured timing or signal strength values. In accordance with such embodiments, the satellite is capable to carry out Doppler measurements and to provide a report about the Doppler measurements to the RAN node. Based on the Doppler shift measurements, the pseudorange may be obtained and, thereby, a distance between the UE and the satellite. Using the Doppler values for determining the pseudorange is a well-known approach in the field of satellite technologies, is not described in more detail here.

Figure 15:
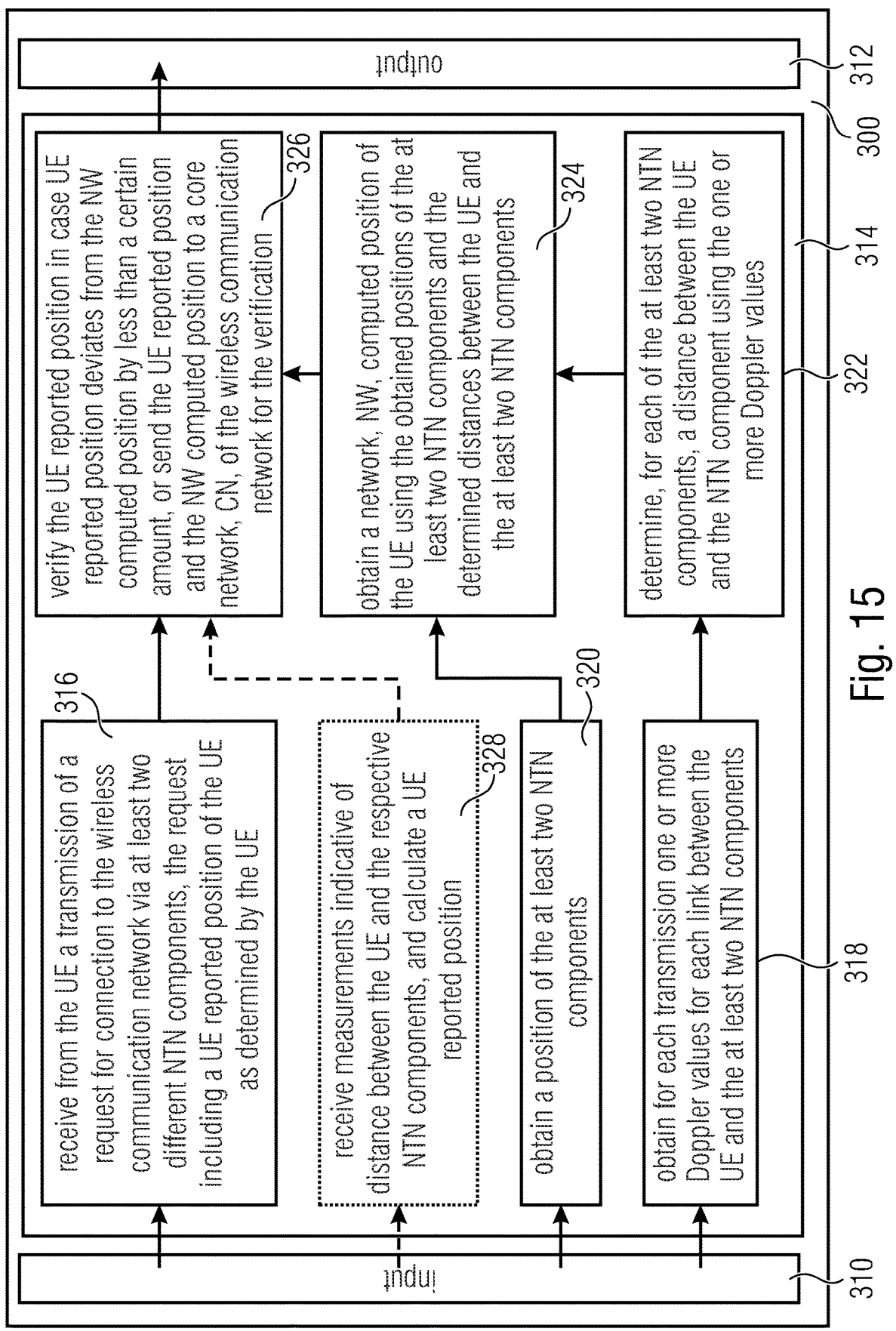
FIG. 15 illustrates a second embodiment of an apparatus in accordance with the second aspect of the present invention employing the Doppler values.

FIG. 15 illustrates a second embodiment of an apparatus in accordance with the second aspect of the present invention employing the Doppler values. The embodiment of FIG. 15 is similar to FIG. 10, except that the apparatus 300 receives 330 the Doppler values. Based on the received Doppler values, the apparatus determines 332 the distance between the UE and the NTN components, so that in the same way as in the first embodiment (see FIG. 10), based on the further information about the position of the NTN components, the NW computed UE position may be determined 324, which is then used for verifying the UE reported UE position, the latter being obtained as described above with reference to FIG. 10.

It is noted that the second aspect of the present invention may be implemented for NTN components using transparent payload or regenerative payload.

General

Although the respective aspects and embodiments of the inventive approach have been described separately, it is noted that each of the aspects/embodiments may be implemented independent from the other, or some or all of the aspects/embodiments may be combined.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments of the present invention, a RAN network entity, like the gNB, comprises one or more of the following: a macro cell base station, or a small cell base station, or a central unit of a base station, or a distributed unit of a base station, or a road side unit (RSU), or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 16:
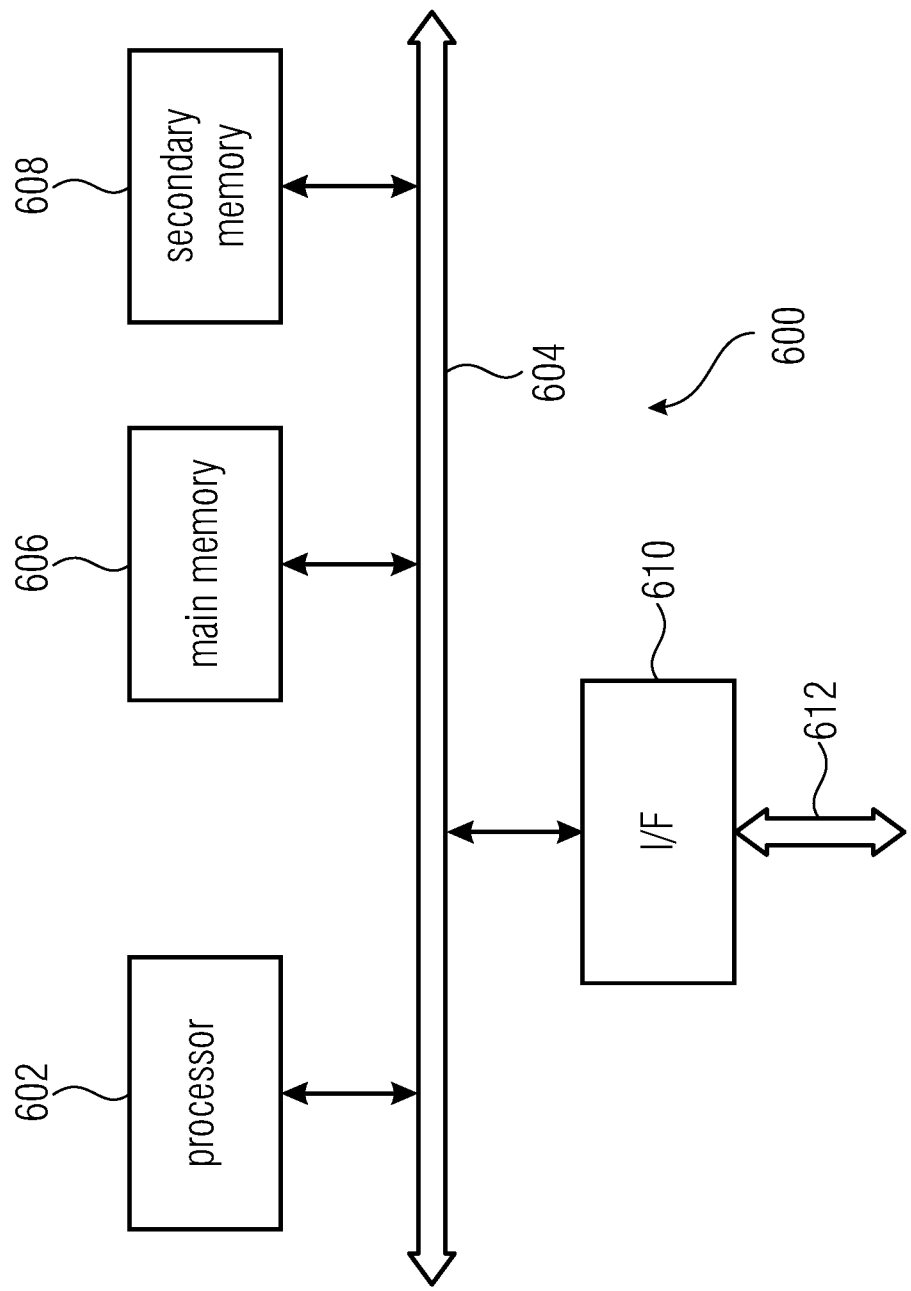
FIG. 16 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 16 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for verifying a position of a user device, UE, in a wireless communication network, the wireless communication network comprising a radio access network, RAN, a core network, CN, and a plurality of non-terrestrial network, NTN, components,
wherein the apparatus is adapted to be located in a RAN entity or in a CN entity, and
wherein the apparatus is adapted to
receive from the UE a transmission of a request for connection to the wireless communication network via at least two different NTN components, the request comprising
a UE reported position of the UE as determined by the UE, or
a UE reported information indicative of a logical coarse location of the UE, or
a UE reported measurement of one or more values indicative of a distance between the UE and the at least two different NTN components, and
verify a position of the UE using network, NW, measured values indicative of a distance between the respective NTN components and the UE.

2. The apparatus of claim 1, wherein the apparatus is adapted to
receive from the UE a transmission of a request for connection to the wireless communication network via at least two different NTN components, the request comprising a UE reported position of the UE as determined by the UE,
acquire for each transmission one or more first values indicative of a distance between the UE and the RAN,
acquire a position of the at least two NTN components,
determine, for each of the at least two NTN components, second values indicative of a distance between the UE and the NTN component using the one or more first values and a distance between the RAN and the NTN component,
acquire a network, NW, computed position of the UE using the acquired positions of the at least two NTN components and the determined distances between the UE and the at least two NTN components, and
verify the UE reported position in case UE reported position deviates from the NW computed position by less than a certain amount, or send the UE reported position and the NW computed position to the CN of the wireless communication network for the verification.

3. The apparatus of claim 1, wherein the apparatus is adapted to
receive from the UE a transmission of a request for connection to the wireless communication network via at least two different NTN components, the request comprising a UE reported measurement of one or more first values indicative of a distance between the UE and the at least two different NTN components,
acquire for each transmission a network, NW, measurement of one or more second values indicative of a distance between the UE and the NTN component,
verify the UE reported measurement in case UE reported measurement deviates from the NW measurement by less than a certain amount, or send the UE reported measurement and the NW measurements to CN of the wireless communication network for the verification.

4. The apparatus of claim 1, wherein the apparatus is adapted to
receive from the UE a transmission of a request for connection to the wireless communication network via at least two different NTN components, the request comprising a UE reported position of the UE as determined by the UE,
acquire for each transmission one or more Doppler values for each link between the UE and the at least two NTN components,
acquire a position of the at least two NTN components,
determine, for each of the at least two NTN components, a distance between the UE and the NTN component using the one or more Doppler values,
acquire a network, NW, computed position of the UE using the acquired positions of the at least two NTN components and the determined distances between the UE and the at least two NTN components, and
verify the UE reported position in case the UE reported position deviates from the NW computed position by less than a certain amount, or send the UE reported position and the NW computed position to the CN of the wireless communication network for the verification.

5. The apparatus of claim 1, wherein the apparatus or the CN is adapted to allow the UE to connect to the wireless communication network only when the UE reported position is verified.

6. The apparatus of claim 1, wherein the apparatus is adapted to signal to the CN of the wireless communication network one of more of the following:
a flag indicating whether the UE reported location is to be trusted by entities in the CN,
a flag indicating that the UE reported location has been verified by the apparatus,
one or more parameters describing a deviation of the UE-reported position from the NW computed position,
one or more parameters describing a reliability of the process determining the UE reported location and/or the NW computed position,
one or more parameters describing a reliability of measurements used in the process determining the UE reported location and/or the NW computed position.

7. The apparatus of claim 6, wherein the apparatus is adapted to signal to the UE and/or to the RAN to use a certain integrity method and report the results.

8. The apparatus of claim 1, wherein the apparatus is adapted to receive from the CN a threshold by which the UE reported position is allowed to deviate from the NW computed position.

9. The apparatus of claim 1, wherein the NTN component comprises one of more of
a spaceborne vehicle, and
an airborne vehicle.

10. A user device, UE, for a wireless communication network, the wireless communication network comprising a radio access network, RAN, a plurality of non-terrestrial network, NTN, components and an apparatus for verifying a position of the UE using network, NW, measured values indicative of a distance between the respective NTN components and the UE,
 wherein the UE is adapted to send a transmission of a request for connection to the wireless communication network via at least two different NTN components, the request comprising
  a UE reported position of the UE as determined by the UE, or
  a UE reported information indicative of a logical coarse location of the UE, or
  a UE reported measurement of one or more values indicative of a distance between the UE and the at least two different NTN components.

11. The user device, UE, of claim 10, wherein the wireless communication network provides a plurality of reference points, each reference points representing a geographical location and being mapped to one or more network parameters,
 wherein, to determine one or more network parameters applicable to the UE at a current location of the UE, the UE is adapted to
  receive assistance data indicating a location of some or all of the plurality of reference points,
  determine from the plurality of reference points a reference point closest to the current location of the UE, and
  derive the network parameters mapped to the closest reference point, and
 wherein the UE is adapted to report the UE reported information indicative of a logical coarse location of the UE and comprising an identifier of the closest reference point or information derived from the assistance data corresponding to the identifier.

12. The user device, UE, of claim 10, wherein the request for connection comprises a REGISTRATION REQUEST to initiate a UE registration procedure for accessing a certain PLMN.

13. The user device, UE, of claim 12, wherein, responsive to the REGISTRATION REQUEST, the UE is adapted to receive a REGISTRATION ACCEPT or a REGISTRATION REJECT, dependent on whether the UE is allowed to access the PLMN.

14. The user device, UE, of claim 13, wherein the UE is adapted to receive
 the REGISTRATION ACCEPT if it is determined that the current location of the UE is in a country where the certain PLMN is allowed to operate, and
 the REGISTRATION REJECT if it is determined that the current location of the UE is in a country where the certain PLMN is not allowed to operate.

15. A method for verifying a position of a user device, UE, in a wireless communication network, the wireless communication network comprising a radio access network, RAN, a core network, CN, and a plurality of non-terrestrial network, NTN, components, the method comprising:
 receiving, by an apparatus for verifying the position of the UE and being located in a RAN entity or in a CN entity, from the UE a transmission of a request for connection to the wireless communication network via at least two different NTN components, the request comprising
  a UE reported position of the UE as determined by the UE, or
  a UE reported information indicative of a logical coarse location of the UE, or
  a UE reported measurement of one or more values indicative of a distance between the UE and the at least two different NTN components, and
 verifying, by the apparatus, a position of the UE using network, NW, measured values indicative of a distance between the respective NTN components and the UE.

16. The method of claim 15, wherein the wireless communication network provides a plurality of reference points, each reference points representing a geographical location and being mapped to one or more network parameters, the method comprising:
 determining, by the UE, one or more network parameters applicable to the UE at a current location of the UE, by
  receiving assistance data indicating a location of some or all of the plurality of reference points,
  determining from the plurality of reference points a reference point closest to the current location of the UE, and
  deriving the network parameters mapped to the closest reference point,
 reporting to the apparatus the UE reported information indicative of a logical coarse location of the UE, the UE reported information indicative of a logical coarse location of the UE comprising an identifier of the closest reference point or information derived from the assistance data corresponding to the identifier.

* * * * *